(12) United States Patent
Kagami et al.

(10) Patent No.: US 7,308,751 B2
(45) Date of Patent: Dec. 18, 2007

(54) MAGNETIC HEAD AND METHOD OF MANUFACTURING SAME, HEAD SUSPENSION ASSEMBLY AND MAGNETIC DISK APPARATUS

(75) Inventors: Takeo Kagami, Chuo-ku (JP); Tetsuya Kuwashima, Chuo-ku (JP); Kentaro Nagai, Atsugi (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/711,120

(22) Filed: Feb. 27, 2007

(65) Prior Publication Data

US 2007/0163103 A1 Jul. 19, 2007

Related U.S. Application Data

(62) Division of application No. 10/944,786, filed on Sep. 21, 2004.

(30) Foreign Application Priority Data

Sep. 30, 2003 (JP) ............................. 2003-342253

(51) Int. Cl.
*G11B 5/33* (2006.01)
*G11B 5/127* (2006.01)
(52) U.S. Cl. ................. 29/603.07; 360/324.2; 360/324.1; 360/324.11; 29/603.12
(58) Field of Classification Search ............. 360/324.2, 360/324.11, 324.12, 324.1; 29/603.07, 603.15, 29/603.12, 603.18
See application file for complete search history.

(56) References Cited

U.S. PATENT DOCUMENTS

| | | | |
|---|---|---|---|
| 5,930,077 A | | 7/1999 | Obata et al. |
| 6,353,318 B1 | * | 3/2002 | Sin et al. ..................... 324/252 |
| 6,470,565 B1 | * | 10/2002 | Sasaki ...................... 29/603.12 |
| 6,537,732 B2 | * | 3/2003 | Kamijima ...................... 430/311 |
| 6,587,316 B2 | * | 7/2003 | Hasegawa ................. 360/324.1 |
| 6,839,205 B2 | * | 1/2005 | Kagami et al. ........... 360/324.1 |
| 6,989,974 B2 | * | 1/2006 | Tetsukawa et al. ....... 360/324.1 |
| 6,992,870 B2 | * | 1/2006 | Kagami et al. ........... 360/324.2 |
| 7,002,781 B2 | * | 2/2006 | Sugawara .............. 360/324.11 |
| 7,057,859 B2 | * | 6/2006 | Kagami et al. ............. 360/317 |
| 7,068,477 B2 | * | 6/2006 | Noma ..................... 360/324.1 |

(Continued)

FOREIGN PATENT DOCUMENTS

JP A 08-297813 11/1996

(Continued)

*Primary Examiner*—Angel Castro
*Assistant Examiner*—Christopher R. Magee
(74) *Attorney, Agent, or Firm*—Oliff & Berridge PLC

(57) ABSTRACT

A magnetic head has less variations in the resistance of a magneto-resistive device before and after the magnetic head is left in a high temperature environment so as to have higher stability of the characteristics of the magnetic head against a high temperature environment. A TMR device includes a tunnel barrier layer made of an oxide layer. A DLC film serving as a protection film and an underlying layer therefor are formed on an end face of the TMR device on an air bearing surface side. A layer made of an oxide of a metal or an oxide of a semiconductor is formed between the underlying layer and the end face of the tunnel barrier layer on the air bearing surface side to be in contact with the end face of the tunnel barrier layer.

9 Claims, 13 Drawing Sheets

U.S. PATENT DOCUMENTS 7,092,223 B2 * 8/2006 Eguchi et al. ......... 360/324.12
7,116,528 B2 * 10/2006 Nagasaka et al. .......... 360/322
2003/0039080 A1 2/2003 Kagami et al.

FOREIGN PATENT DOCUMENTS

| JP | A 09-128708 | 5/1997 |
|---|---|---|
| JP | A 09-231539 | 9/1997 |
| JP | A 2003-27258 | 1/2003 |

* cited by examiner

MAGNETIC HEAD AND METHOD OF MANUFACTURING SAME, HEAD SUSPENSION ASSEMBLY AND MAGNETIC DISK APPARATUS

This is a Division of application Ser. No. 10/944,786 filed Sep. 21, 2004. The disclosure of the prior application is hereby incorporated by reference herein in its entirety.

BACKGROUND OF THE INVENTION

The present invention relates to a magnetic head, a method of manufacturing the magnetic head, a head suspension assembly and a magnetic disk apparatus.

With the trend to a larger capacity and a smaller size of hard disk drives (HDD), heads are required to have a higher sensitivity and a larger output. To meet these requirements, strenuous efforts have been made to improve the characteristics of GMR heads (Giant Magneto-Resistive Head) currently available on the market. On the other hand, intense development is under way for a tunnel magneto-resistive head (TMR head) which can be expected to have a resistance changing ratio twice or more higher than the GMR head.

Generally, the GMR head differs from the TMR head in the head structure due to a difference in a direction in which a sense current is fed. A head structure adapted to feed a sense current in parallel with a film surface, as in a general GMR head, is referred to as a CIP (Current In Plane) structure, while a head structure adapted to feed a sense current perpendicularly to a film surface, as in the TMR head, is referred to as a CPP (Current Perpendicular to Plane) structure. Since the CPP structure can use a magnetic shield itself as an electrode, it is essentially free from short-circuiting between the magnetic shield and a device (defective insulation) which is a serious problem in reducing a lead gap in the CIP structure. For this reason, the CPP structure is significantly advantageous in providing a higher recording density.

Other than the TMR head, also known as a head in CPP structure is, for example, a CPP-GMR head which has the CPP structure, though a spin valve film (including a specular type and dual spin valve type magnetic multilayer film) is used for a magneto-resistive device (see JP-A-2003-60262 corresponding to U.S. patent application Publication No. 2003/0039080).

Some magnetic heads comprise a magneto-resistive device which has a magneto-resistive layer including an oxide layer. For example, a TMR head employs an oxide layer made of $Al_2O_3$ or the like for a tunnel barrier layer which forms a part of a magneto-resistive layer (see JP-A-2003-27258 and JP-A-2003-60262). A CPP-GMR head may include an oxide layer such as a thin insulating layer which acts as a current path control layer partially having a metal region within an insulating region formed between two layers in order to effectively reduce the area of the path through which a sense current flows (see JP-A-2003-60262).

In a magnetic head, since the end face of the magneto-resistive device appears on a side facing to a magnetic recording medium, i.e., an air bearing surface (hereinafter abbreviated as "ABS"), it is necessary to prevent corrosion of end faces of metal layers which make up the magneto-resistive device. It is also necessary to enhance the slidability of the ABS for avoiding head crush, damages to a magnetic recording medium, and the like. Particularly, in a magnetic disk apparatus which employs a CSS (contact start stop) method, the ABS of a magnetic head comes into contact with the surface of a disk at the start and end of driving, so that the ABS is required to have a high slidability (low friction). To meet the requirements, conventionally, the ABS is formed with a protection film for increasing the aforementioned corrosion resistance and slidability, so that the end face of the magneto-resistive device on the ABS side is covered with the protection film. Generally, the protection film is made of a DLC (Diamond-Like-Carbon) film (see JP-A-2003-27258, JP-A-8-297813, JP-A-9-231539, JP-A-9-128708, JP-A-7-6340 corresponding to U.S. Pat. No. 5,930,077, and JP-A-2003-60262 corresponding to U.S. patent application Publication No. 2003/0039080).

JP-A-2003-27258 and JP-A-8-297813 disclose a silicon film or a silicon oxide film used for an underlying layer of a DLC film, i.e., a protection film, in order to act as an adhesive layer. JP-A-9-231539 and JP-A-9-128708 disclose a silicon film used for an underlying layer of a DLC film, i.e., a protection film, in order to act as an adhesive layer. JP-A-7-6340 in turn discloses that an underlying layer (referred to as an "intermediate layer" in JP-A-7-6340) of a DLC film (i.e., a protection film) is formed of a layer made of at least one element selected from the group consisting of hard carbon, silicon, boron, titanium and aluminum, and carbide, nitride and oxide of silicon, boron, titanium, or aluminum. Further, JP-A-7-6340 discloses a sputtering method used for forming the underlying layer of the DLC film, and also discloses, with respect to a sputtering target and a sputtering gas, that there are (i) a method which uses a plate of the same element as the film to be formed, or a plate of a compound including the same element and an argon gas, and (ii) a method which uses a plate of an element which is included in the film and a hydrocarbon gas, an ammonia gas or an oxygen gas, when the underlying layer to be formed is made of a carbide, a nitride or an oxide, and that any of the two method may be used for the intended purpose.

The result of an investigation made by the present inventors has revealed that in a magnetic head which comprises a magneto-resistive device having a magneto-resistive layer including an oxide layer, for example, such as a TMR head, when an underlying layer of a protection layer formed on ABS is made, for example, of a silicon film, the resistance of the magneto-resistive device relatively largely varies before and after the magnetic head is left in a high temperature environment, thus exhibiting low stability of the characteristics of the magnetic head with respect to a high temperature environment.

SUMMARY OF THE INVENTION

It is an object of the present invention to provide a magnetic head which comprises a magneto-resistive device having a magneto-resistive layer including an oxide layer but has less variations in the resistance of the magneto-resistive device before and after the magnetic head is left in a high temperature environment to have higher stability of the characteristics of the magnetic head against a high temperature environment, a method of manufacturing such a magnetic head, and a head suspension assembly and a magnetic disk apparatus which use the magnetic head.

The result of an additional investigation made by the present inventors has revealed that in a magnetic head comprising a magneto-resistive device having a magneto-resistive layer including an oxide layer and, for example, using a silicon film for an underlying layer of a protection film formed on ABS, the resistance of the magneto-resistive device relatively largely varies before and after the magnetic head is left in a high temperature environment for the following reason. It can be thought that when the magnetic head is left in a high temperature environment, oxygen present in the oxide film forming a part of the magneto-resistive device migrates into the underlying layer, so that the oxide layer contains less oxygen and thereby has a lower resistance. As a result, it can be thought that as a result, the resistance of the whole magneto-resistive device becomes lower, probably causing the resistance of the magneto-resistive device to relatively largely vary.

Consequently, the present inventors thought that when the underlying layer of the protection film was made of a material except for an oxide, if a layer made of an oxide of a metal or an oxide of a semiconductor was interposed between the underlying layer of the protection film and the oxide layer forming a part of the magneto-resistive layer so as to be in contact with the oxide layer forming the part of the magneto-resistive layer, oxygen present in the oxide layer forming the part of the magneto-resistive layer is less prone to go out of the oxide layer and remains within the oxide layer, even if the magnetic head was left in a high temperature environment. This is because the oxide of the metal or the oxide of the semiconductor has already bound with oxygen and therefore there is few opportunities for the oxygen to bind. The inventors further thought that from the fact that the oxygen present in the oxide layer forming the part of the magneto-resistive layer remains within the oxide layer even if the magnetic head is left in a high temperature environment, the resistance of the oxide layer would not be significantly reduced to cause less variations in the resistance of the magneto-resistive device. The inventors confirmed this hypothesis by an experiment.

The present invention has been made based on the novel knowledge as described above. A magnetic head according to a first aspect of the present invention includes: a base; a magneto-resistive device having a magneto-resistive layer including an oxide layer, the magneto-resistive layer being formed on one surface side of the base; and a protection film and an underlying layer therefor which are formed on at least a part of a surface of the base on a side facing to a magnetic recording medium and on an end face of the magneto-resistive device on a side facing to the magnetic recording medium, wherein an end face of the oxide layer on a side facing to the magnetic recording medium forms a part of the end face of the magneto-resistive device on the side facing to the magnetic recording medium, one or more layers are interposed between the underlying layer and the end face of the magneto-resistive device to cover at least the end face of the oxide layer, the underlying layer is made of a material except for an oxide, and the layer of the one or more layers closest to the end face of the magneto-resistive device is made of an oxide of a metal or an oxide of a semiconductor.

According to the first aspect, in accordance with the aforementioned knowledge, although the magnetic head comprises the magneto-resistive device having a magneto-resistive layer including an oxide layer, the resistance of the magneto-resistive device presents less varies before and after the magnetic head is left in a high temperature environment, thus improving the stability of the characteristics against a high temperature environment.

A magnetic head according to a second aspect of the present invention is arranged in a manner that, in the first aspect, the magneto-resistive layer includes a tunnel barrier layer, a free layer formed on one surface side of the tunnel barrier layer, a pinned layer formed on other surface side of the tunnel barrier layer, and a pinning layer formed on one surface side of the pinned layer opposite to the tunnel barrier layer, and the oxide layer comprises the tunnel barrier layer. The second aspect is an example in which the first aspect is applied to a TMR head.

A magnetic head according to a third aspect of the present invention is arranged in a manner that, in the first aspect, an effective region effectively involved in detection of magnetism in the magneto-resistive layer is a region in which a current flows in a direction substantially perpendicular to the film plane in the magneto-resistive layer, the magneto-resistive layer includes a non-magnetic metal layer, a free layer formed on one surface side of the non-magnetic metal layer, a pinned layer formed on other surface side of the non-magnetic metal layer, a pinning layer formed on one surface side of the pinned layer opposite to the non-magnetic metal layer, and a current path control layer formed between arbitrary two layers over a region substantially overlapping with at least the effective region, the current path control layer partially having a metal region within an insulating region, and the oxide layer comprises the current path control layer. The third aspect provides an example in which the first aspect is applied to a CPP-GMR head.

A magnetic head according to a fourth aspect of the present invention is arranged in a manner that, in any of the first to third aspects, the protection film comprises a DLC film. While the fourth aspect provides an example of the protection film, the protection film is not necessarily limited to the DLC film in the first to third aspects.

A magnetic head according to a fifth aspect of the present invention is arranged in a manner that, in any of the first to fourth aspects, the underlying layer is made of Si or SiC. The fifth aspect provides an example of the underlying layer.

A magnetic head according to a sixth aspect of the present invention is arranged in a manner that, in any of the first to fifth aspects, the oxide is an oxide of a material selected from a group consisting of Al, Si, Ti, V, Cr, Mn, Fe, Ni, Co, Cu, Zn, Zr, Nb, Mo, Hf, Ta, and W. While the sixth aspect enumerates examples of preferred materials for the oxide for use in making the layer in contact with the end face of the oxide layer which forms a part of the magneto-resistive layer, the first to fifth aspects are not limited to these examples.

A magnetic head according to a seventh aspect of the present invention is arranged in a manner that, in any of the first to sixth aspects, the magneto-resistive layer includes a metal layer laminated adjacent to the oxide layer, an end face of the metal layer on a side facing to the magnetic recording medium forms a part of the end face of the magneto-resistive device on the side facing to the magnetic recording medium, the one or more layers are formed to cover the end face of the metal layer, the layer of the one or more layers closest to the end face of the magneto-resistive device includes a portion which is made of the same elements as elements which participate in making the oxide layer and covers the end face of the oxide layer and a portion which is made of an oxide of the same metal as a metal which participates in making the metal layer and covers the end face of the metal layer.

In the first to sixth aspects, the layer of the one or more layers closest to the end face of the magneto-resistive device may be made by adding a predetermined material from the outside to the layers formed to make up the magneto-resistive device, separately from the layer formed to make up the magneto-resistive device during the manufacturing, like an eighth and a ninth aspect, later described. Also, in the first to sixth aspects, the layer of the one or more layers closest to the end face of the magneto-resistive device may be made by oxidizing an end portion of the layer itself formed to participate in making up the magneto-resistive device during the manufacturing, like an tenth aspect later described. The magnetic head according to the seventh aspect provides an example of the latter magnetic head.

A method according to an eighth aspect of the present invention is a method of manufacturing the magnetic head according to any of the first to sixth aspects, which includes the step of forming the layer of the one or more layers closest to the end face of the magneto-resistive device in a region including the end face of the magneto-resistive device on the side facing to the magnetic recording medium before forming the protection film, wherein the step includes a first step of depositing a metal or a semiconductor, and a second step of oxidizing the metal or semiconductor deposited in the first step.

The oxidization in the second step may be natural oxidization by placing the metal or semiconductor layer in the atmosphere or in a controlled oxygen atmosphere, or may be forced oxidization such as plasma oxidization, radical oxidization, ion beam oxidization, exposure to ozone, or the like. This is applied as well to an eleventh aspect later described.

According to the eighth aspect, after the metal or semiconductor is deposited on the end face of the magneto-resistive device, the metal or semiconductor is oxidized, thus making it possible to prevent oxygen from excessively attaching to the end face of the magneto-resistive device. If oxygen excessively attaches to the end face of the magneto-resistive device, the excessive oxygen will migrate into the oxide layer forming a part of the magneto-resistive layer, when the manufactured magnetic head is left in a high temperature environment, thereby increasing the resistance of the magneto-resistive device to cause relatively large variations in the resistance. According to the eighth aspect, since oxygen can be prevented from excessively attaching to the end face of the magneto-resistive device, it is possible to prevent variations in the resistance of the magneto-resistive device due to an increase in the resistance, as well as to prevent variations in the resistance of the magneto-resistive device due to a reduction in the resistance, even if the magnetic head in use is left in a high temperature environment.

A method according to a ninth aspect of the present invention is a method of manufacturing the magnetic head according to any of the first to sixth aspects, which includes the step of forming the layer of the one or more layers closest to the end face of the magneto-resistive device in a region including the end face of the magneto-resistive device on the side facing to the magnetic recording medium before forming the protection film, wherein the step includes the step of performing ion beam deposition or sputtering using an oxide of a metal or an oxide of a semiconductor as a target without using oxygen for a process gas.

According to the ninth aspect, the ion beam deposition or sputtering is performed using an oxide of a metal or an oxide of a semiconductor as a target without using oxygen for a process gas to form the layer in contact with the end face of the oxide layer which forms a part of the magneto-resistive device, thus making it possible to prevent oxygen from excessively attaching to the end face of the magneto-resistive device. Consequently, according to the ninth aspect, it is possible to prevent variations in the resistance of the magneto-resistive device due to an increase in the resistance, as well as to prevent variations in the resistance of the magneto-resistive device due to a reduction in the resistance, even if the magnetic head in use is left in a high temperature environment, as is the case with the eighth aspect. In addition, while the eight aspect requires the step of oxidizing the layer after the deposition, the ninth aspect does not need any special step for oxidization, thus facilitating the manufacturing and reducing the cost.

Generally, when the ion beam deposition or sputtering is performed using an oxide of a metal or an oxide of a semiconductor as a target to form the layer in contact with the end face of the magneto-resistive device, not only a rare gas such as an Ar gas but also an additional oxygen gas are introduced as process gases in order to increase the insulating property of the layer to prevent electric short-circuiting between the metal layers which make parts of the magneto-resistive device, such that the layer is formed in an oxygen-rich atmosphere. However, if the oxygen gas is additionally used as a process gas, oxygen will excessively attach to the end face of the magneto-resistive device. Therefore, when the manufactured magnetic head is left in a high temperature environment, the excessive oxygen will migrate into the oxide layer which forms a part of the magneto-resistive device, thereby causing an increase in the resistance of the magneto-resistive device and resulting variations in the resistance over a relatively large range. On the other hand, according to the ninth aspect, such a situation can be prevented, as described above.

A method according to a tenth aspect of the present invention is a method of manufacturing the magnetic head according to the seventh aspect, which includes the step of forming the layer of the one or more layers closest to the end face of the magneto-resistive device in a region including the end face of the magneto-resistive device on the side facing to the magnetic recording medium before forming the protection film, wherein the step includes the step of oxidizing an end portion of a layer formed to make up the magneto-resistive device.

The oxidization of the end portion of the layer formed to participate in making up the magneto-resistive device may be natural oxidization by placing the layer in the atmosphere or in a controlled oxygen atmosphere, or may be forced oxidization such as plasma oxidization, radical oxidization, ion beam oxidization, exposure to ozone, or the like. This is applied as well to a thirteenth aspect, later described.

In the eighth and ninth aspects, separately from the layer formed to participate in making up the magneto-resistive device, a predetermined material is added to the layer from the outside to form the aforementioned layer closest to the end face of the magneto-resistive device. In contrast, in the tenth aspect, an end portion of the layer itself formed to participate in making up the magneto-resistive device is oxidized to form the aforementioned layer closest to the end face of the magneto-resistive device. Consequently, in the tenth aspect, since the step of adding a predetermined material from the outside is not required, the manufacturing can be further facilitated to further reduce the cost.

A method according to a eleventh aspect of the present invention is a method of manufacturing a magnetic head comprising a base; a magneto-resistive device having a magneto-resistive layer including an oxide layer, the magneto-resistive layer being formed on one surface side of the base; and a protection film formed on at least a part of a surface of the base on a side facing to a magnetic recording medium and on an end face of the magneto-resistive device on a side facing to the magnetic recording medium; wherein an end face of the oxide layer on a side facing to the magnetic recording medium forms a part of the end face of the magneto-resistive device on the side facing to the magnetic recording medium, one or more layers are interposed between the protection film and the end face of the magneto-resistive device to cover at least the end face of the oxide layer, and the layer of the one or more layers closest to the end face of the magneto-resistive device is made of an oxide of a metal or an oxide of a semiconductor. The method according to the eleventh aspect includes the step of forming the layer of the one or more layers closest to the end face of the magneto-resistive device in a region including the end face of the magneto-resistive device on the side facing to the magnetic recording medium before forming the protection film, wherein the step includes a first step of depositing a metal or a semiconductor, and a second step of oxidizing the metal or semiconductor deposited in the first step.

A method according to a twelfth aspect of the present invention is a method of manufacturing a magnetic head comprising a base; a magneto-resistive device having a magneto-resistive layer including an oxide layer, the magneto-resistive layer being formed on one surface side of the base; and a protection film formed on at least part of a surface of the base on a side facing to a magnetic recording medium and on an end face of the magneto-resistive device on a side facing to the magnetic recording medium; wherein an end face of the oxide layer on a side facing to the magnetic recording medium forms a part of the end face of the magneto-resistive device on the side facing to the magnetic recording medium, one or more layers are interposed between the protection film and the end face of the magneto-resistive device to cover at least the end face of the oxide layer, and the layer of the one or more layers closest to the end face of the magneto-resistive device is made of an oxide of a metal or an oxide of a semiconductor. The method according to the twelfth aspect includes the step of forming the layer of the one or more layers closest to the end face of the magneto-resistive device in a region including the end face of the magneto-resistive device on the side facing to the magnetic recording medium before forming the protection film, wherein the step includes the step of performing ion beam deposition or sputtering using an oxide of a metal or an oxide of a semiconductor as a target without using oxygen for a process gas.

A method according to a thirteenth aspect of the present invention is a method of manufacturing a magnetic head comprising a base; a magneto-resistive device having a magneto-resistive layer including an oxide layer and a metal layer, the magneto-resistive layer being formed on one side of the base, the oxide layer and the metal layer being laminated adjacent to each other; and a protection film formed on at least a part of a surface of the base on a side facing to a magnetic recording medium and on an end face of the magneto-resistive device on a side facing to the magnetic recording medium; wherein end faces of the oxide layer and the metal layer on a side facing to the magnetic recording medium forms parts of the end face of the magneto-resistive device on the side facing to the magnetic recording medium, one or more layers are interposed between the protection film and the end face of the magneto-resistive device to cover at least the end faces of the oxide layer and the metal layer, and the layer of the one or more layers closest to the end face of the magneto-resistive device is made of an oxide of a metal or an oxide of a semiconductor, the layer of the one or more layers closest to the end face of the magneto-resistive device includes a portion which is made of the same elements as elements which participate in making the oxide layer and covers the end face of the oxide layer and a portion which is made of an oxide of the same metal as a metal which participates in making the metal layer and covers the end face of the metal layer. The method according to the thirteenth aspect includes the step of forming the layer of the one or more layers closest to the end face of the magneto-resistive device in a region including the end face of the magneto-resistive device on the side facing to the magnetic recording medium before forming the protection film, wherein the step includes the step of oxidizing an end portion of a layer formed to make up the magneto-resistive device.

The manufacturing methods according to the eleventh to thirteenth aspects are basically similar to the manufacturing methods according to the eighth to tenth aspects, respectively. However, while the magnetic heads manufactured according to the eighth to tenth aspects include the underlying layer of the protection film other than the layer in contact with the end face of the magneto-resistive device, the magnetic heads manufactured according to the eleventh to thirteenth aspects may include such an underlying layer of the protection film other than the layer in contact with the end face of the magneto-resistive device, or the layer itself in contact with the end face of the magneto-resistive device may serve to be the underlying layer of the protection film.

As can be understood from the aforementioned knowledge, even when the layer itself in contact with the end face of the magneto-resistive device serves to be the underlying layer of the protection film, it is possible to prevent variations in the resistance of the magneto-resistive device due to a reduction of the resistance even if the magnetic head is left in a high temperature environment, in a manner similar to the magnetic head according to the fifth aspect, due to the fact that the layer is made of an oxide of a metal or an oxide of a semiconductor. Therefore, with a magnetic head in which the underlying layer of the protection film is made of a silicon oxide and is formed to be in contact with the end face of the magneto-resistive device, for example, as disclosed in JP-A-2003-27258, variations in the resistance of the magneto-resistive device due to a reduction in the resistance is essentially prevented even if the magnetic head is left in a high temperature environment when in use.

However, even with such a magnetic head, if an employed manufacturing method involves attaching of excessive oxygen on the end face of the magneto-resistive device during the manufacturing, the excessive oxygen will migrate into the oxide layer which forms a part of the magneto-resistive layer, when the resulting magnetic head is left in a high temperature environment, thereby increasing the resistance of the magneto-resistive device to cause relatively large variations in the resistance.

In contrast, according to the eleventh to thirteenth aspects, because of the employment of manufacturing methods basically similar to the eighth to tenth aspects, respectively, it is possible to prevent oxygen from excessively attaching to the end face of the magneto-resistive device. Thus, it is possible to prevent variations in the resistance of the magneto-resistive device due to an increase in the resistance, as well as to prevent variations in the resistance of the magneto-resistive device due to a reduction in the resistance, even if the manufactured magnetic head is left in a high temperature environment.

A method of manufacturing a magnetic head according to fourteenth aspect of the present invention is arranged in a manner that, in any of the eighth to tenth aspect, the method further includes the step of thermally treating a member formed with the protection film after the formation of the protection film. This thermal treatment is preferably performed at temperatures equal to or higher than the highest temperature in an environment in which the magnetic head is actually used.

In the fourteenth aspect, since the thermal treatment is positively performed beforehand, oxygen is more prevented from going into or out of the oxide layer which forms a part of the magneto-resistive device, for example, in a actually used temperature range, when the magnetic head is actually used, to reduce variations in the resistance of the magneto-resistive device further.

A head suspension assembly according to a fifteenth aspect of the present invention comprises a magnetic head and a suspension for supporting the magnetic head near a leading end thereof, wherein the magnetic head is the magnetic head according to any of the first to seventh aspects, or the magnetic head is manufactured by the manufacturing method according to any of the eleventh to fourteenth aspects.

Since the head suspension assembly according to the fifteenth aspect employs the magnetic head according to any of the first to seventh aspects, or the magnetic head manufactured by the manufacturing method according to any of the eleventh to fourteenth aspects, it is possible to provide a magnetic disk apparatus or the like which has higher stability of the characteristics against a high temperature environment.

A magnetic disk apparatus according to a sixteenth aspect of the present invention includes a head suspension assembly according to the fifteenth aspect, an arm for supporting the head suspension assembly, and an actuator for moving the arm to position the magnetic head.

According to the sixteenth aspect, since the magnetic disk apparatus employs the head suspension assembly according to the fifteenth aspect, the magnetic disk apparatus has higher stability of the characteristics against a high temperature environment.

DESCRIPTION OF THE EMBODIMENTS

In the following, a magnetic head, a method of manufacturing the magnetic head, a head suspension assembly and a magnetic disk apparatus according to the present invention will be described with reference to the accompanying drawings.

First, a magnetic head according to a first embodiment of the present invention will be described with reference to FIGS. 1 to 5.

Figure 1:
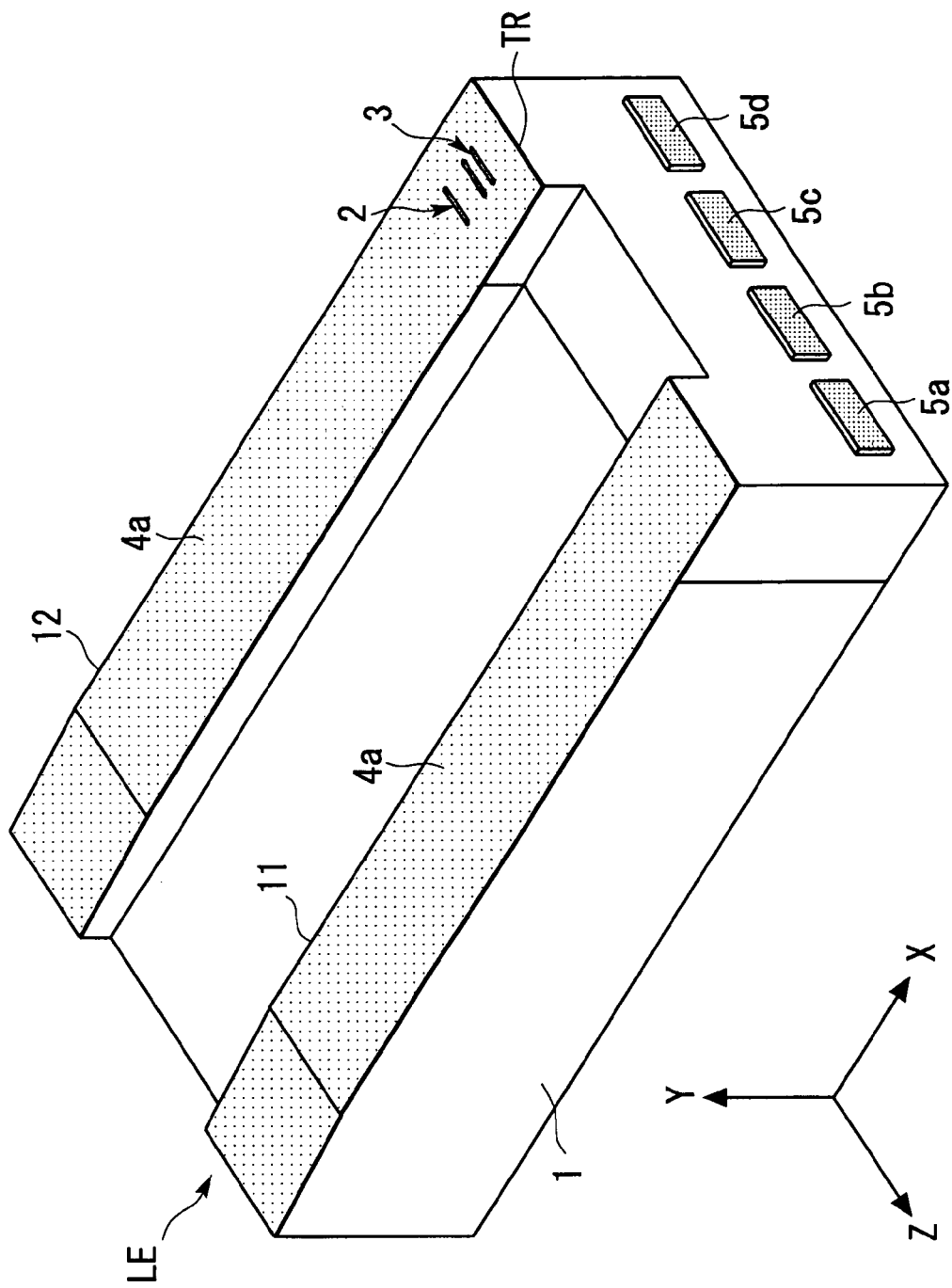
FIG. 1 is a general perspective view schematically illustrating a magnetic head according to a first embodiment of the present invention.
Figure 2:
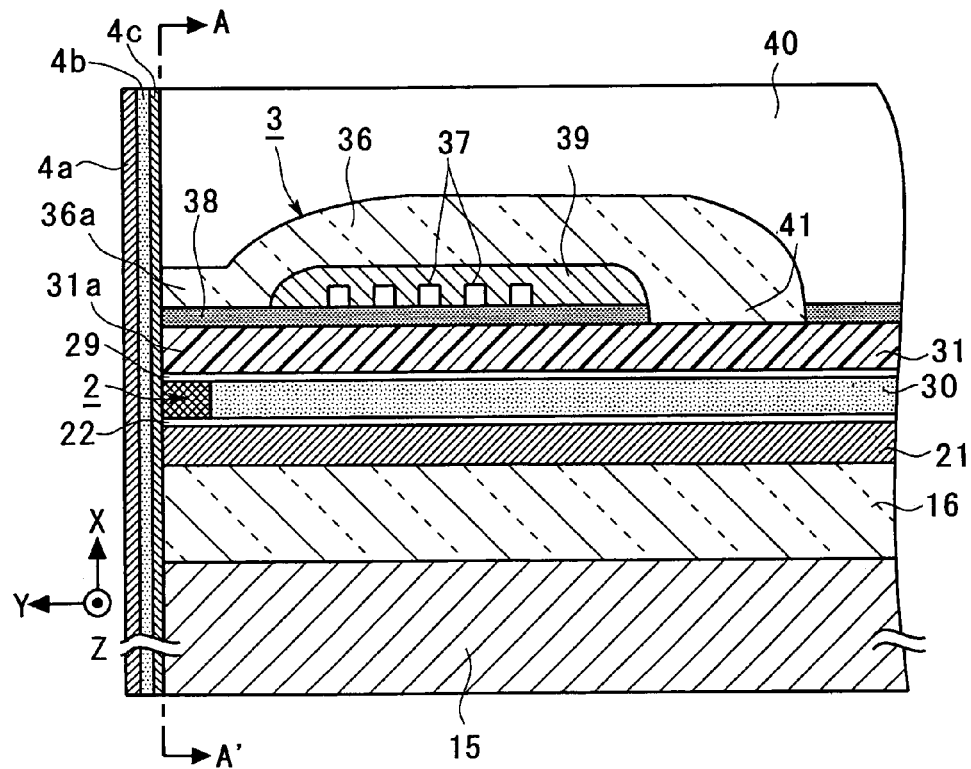
FIG. 2 is an enlarged cross-sectional view schematically illustrating a portion of a TMR device and an inductive magnetic transducing device in the magnetic head illustrated in FIG. 1.
Figure 3:
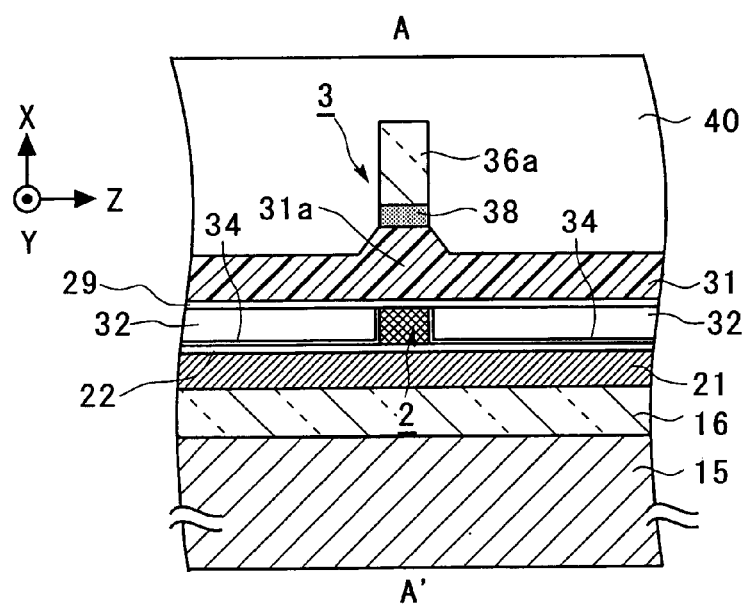
FIG. 3 is a general sectional view taken along a line A-A' indicated by arrows in FIG. 2.
Figure 4:
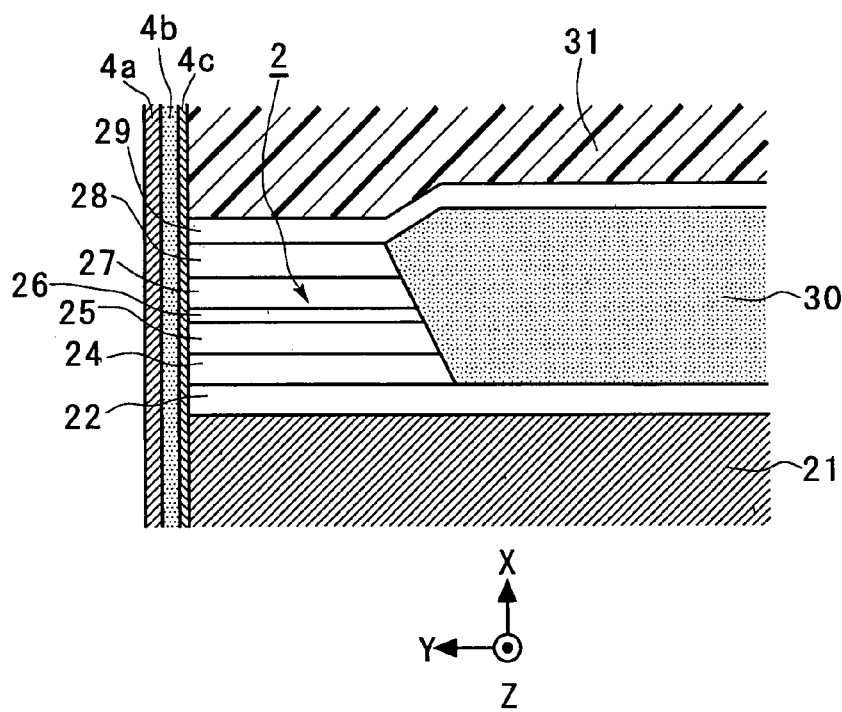
FIG. 4 is a further enlarged view around the TMR device in FIG. 2.
Figure 5:
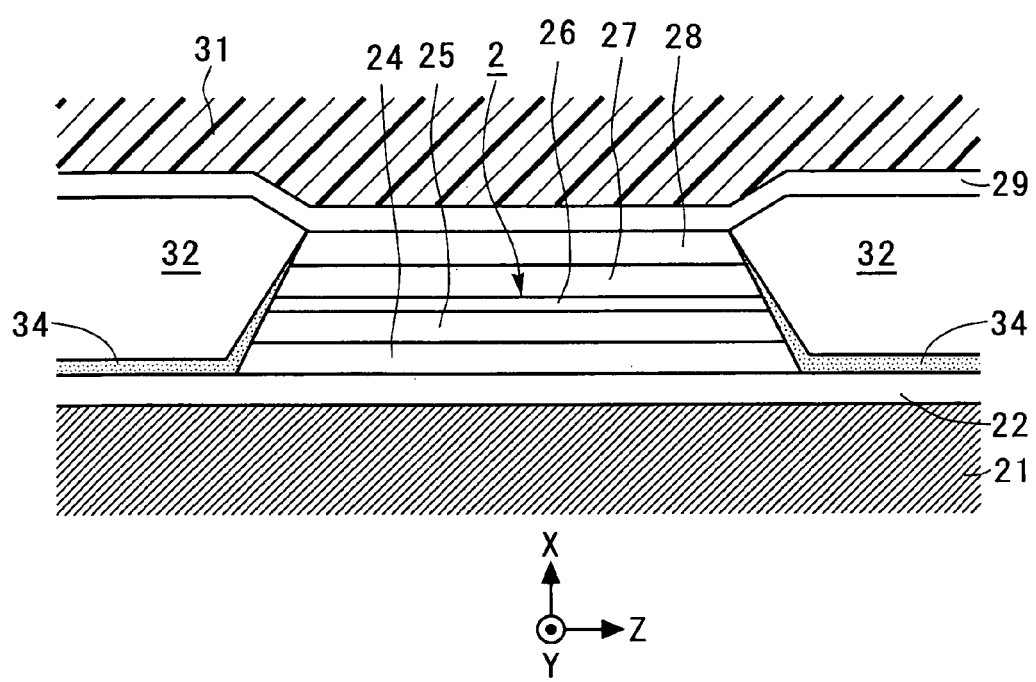
FIG. 5 is a further enlarged view around the TMR device in FIG. 3.

FIG. 1 is a general perspective view schematically illustrating the magnetic head according to the first embodiment of the present invention. FIG. 2 is an enlarged cross-sectional view schematically illustrating a portion of a TMR device 2 and an inductive magnetic transducing device 3 in the magnetic head illustrated in FIG. 1. FIG. 3 is a general sectional view taken along a line A-A' indicated by arrows in FIG. 2. FIG. 4 is a further enlarged view illustrating around the TMR device 2 in FIG. 2. FIG. 5 is a further enlarged view around the TMR device 2 in FIG. 3. For facilitating the understanding, an X-axis, a Y-axis and a. Z-axis, orthogonal to one another, are defined as shown in FIG. 1 to 5 (the same applies to figures later described). The Z-axis direction indicated by the arrow is referred to as the "+Z-direction" or "+Z-side," and the opposite direction is referred to as the "−Z-direction" or "−Z-side." The same is applied to the X-axis direction and Y-axis direction. The X-axis direction is the same as a direction in which a magnetic recording medium is moved. The Z-axis direction is the same as a track width direction of the TMR device 2.

As illustrated in FIG. 1, the magnetic head according to the first embodiment comprises a slider 1 as a base; the TMR device 2 as a magneto-resistive device for use as a magnetic head device for reproduction; an inductive magnetic transducing device 3 as a magnetic head device for recording; and a protection film 4a, and is configured as a composite magnetic head. However, the magnetic head according to the present invention may comprise only the TMR device 2. Also, while the magnetic head of the first embodiment comprises one each of the devices 2, 3, the numbers of these devices are not limited in any sense.

The slider 1 has rails 11, 12 on a surface opposite to a magnetic recording medium, and the surfaces of the rails 11, 12 define air bearing surfaces (ABS). In the example illustrated in FIG. 1, there are two rails 11, 12, but the number of rails is not limited to two. For example, the slider 1 may have one to three rails, or the ABS may be a flat surface without rails. In addition, the ABS may be formed with a variety of geometric shapes for improving a floating characteristic and the like. The magnetic head according to the present invention may have any type of slider.

In the first embodiment, the protection film 4a is applied only on the surfaces of the rails 11, 12, so that the surface of the protection film 4a defines the ABS. Actually, the protection film 4a may be applied on the entire surface of the slider 1 opposite to a magnetic recording medium. This protection film 4a will be described later in greater detail.

The TMR device 2 and inductive magnetic transducing device 3 are disposed on the rail 12 near an air outlet end TR, as illustrated in FIG. 1. A direction in which a recording medium is moved is identical to the X-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with bonding pads 5a, 5b connected to the TMR device 2, and bonding pads 5c, 5d connected to the inductive magnetic transducing device 3.

As illustrated in FIGS. 2 and 3, the TMR device 2 and inductive magnetic transducing device 3 are laminated on an underlying layer 16 deposited on a ceramic base 15 which constitutes the slider 1. The ceramic base 15 is generally made of AlTiC ($Al_2O_3$—TiC), SiC or the like. When $Al_2O_3$—TiC is used, an insulating film made, for example, of $Al_2O_3$ is used for the underlying layer 16 since $Al_2O_3$—TiC is electrically conductive. The underlying layer 16 may not be provided in some cases.

As illustrated in FIGS. 4 and 5, the TMR device 2 comprises a lower electrode 21 formed on the underlying layer 16; an upper electrode 31 formed overlying the lower electrode 21 (opposite to the base 15); and a lower metal layer (lower layer) 22, a lower metal layer (upper layer) 23, a pinning layer 24, a pinned layer 25, a tunnel barrier layer 26, a free layer 27, and a upper metal layer (cap layer) 28 which serves as a protection layer, and an upper metal layer 29 as an underlying layer of the upper electrode 31, which are laminated in this order from the lower electrode 21 between the electrodes 21, 31. The pinning layer 24, pinned layer 25, tunnel barrier layer 26 and free layer 27 constitute a magneto-resistive layer. While the actual TMR device 2 typically has a laminate structure composed of a larger number of layers, rather than the laminate structure composed of the number of layers as illustrated, the illustrated magnetic head represents a laminate structure minimally required for the basic operation of the TMR device 2 for simplifying the description.

In the first embodiment, the lower electrode 21 and upper electrode 31 are additionally used as a lower magnetic shield and an upper magnetic shield, respectively. The electrodes 21, 31 are formed of a magnetic material, for example, NiFe or the like. Though not shown, these electrodes 21, 31 are electrically connected to the aforementioned bonding pads 5a, 5b, respectively. It should be understood that a lower magnetic shield and an upper magnetic shield may be provided in addition to the lower electrode 21 and upper electrode 31.

The lower metal layer 22 is an electrically conductive material which is comprised, for example, of a two-layer film made up of a lower Ta layer and an upper NiFe layer or the like. In the first embodiment, the lower metal layer 22 widely extends over the electrode 21. Alternatively, the lower metal layer 22 may be formed only coextensively to the magneto-resistive layer.

The pinning layer 24, which is comprised of an antiferromagnetic layer, is preferably formed, for example, of an Mn-based alloy such as PtMn, IrMn, RuRhMn, FeMn, NiMn, PdPtMn, RhMn, CrMnPt, or the like. The pinned layer 25 and free layer 27 are each comprised of a ferromagnetic layer formed of such a material as Fe, Co, Ni, FeCo, NiFe, FeCoNi, or the like. The pinned layer 25 has its magnetization direction fixed in a predetermined direction by an exchange bias magnetic field between the pinned layer 25 and the pinning layer 24. On the other hand, the free layer 27 freely varies its magnetization direction in response to an external magnetic field which is basically magnetic information. The pinned layer 25 and free layer 27 are not limited to single-layers, but may implemented, for example, by a laminate comprised of a combination of a pair of magnetic layers in anti-ferromagnetic coupling and a non-magnetic metal layer sandwiched therebetween. Such a laminate may be formed, for example, of three ferromagnetic layers made of CoFe/Ru/CoFe. In the first embodiment, while the pinning layer 24, pinned layer 25, tunnel barrier layer 26 and free layer 27 are laminated in this order from the lower electrode 21. Alternatively, the free layer 27, tunnel barrier layer 26, pinned layer 25 and pinning layer 24 may be laminated in this order from the lower electrode 21, such that the upper metal layer 28 is formed to be in contact with the pinning layer 24. The tunnel barrier layer 26 is formed, for example, of an oxide such as $Al_2O_3$, NiO, GdO, MgO, $Ta_2O_5$, $MoO_2$, $TiO_2$, $WO_2$, or the like, so that the tunnel barrier layer 26 is an oxide layer.

The upper metal layer 28 is formed of a single-layer film or a composite-layer film made of simple Ta, Rh, Ru, Os, W, Pd, Pt, or Au, or an alloy made up of two or more of these elements in combination.

The upper metal layer 29, serving as the underlying layer of the upper electrode 31, is made of an electrically conductive material formed of a non-magnetic metal such as Ta or the like. In the first embodiment, the upper metal layer 29 is provided for holding a magnetic shield gap (a gap between the electrodes 21, 31) of a desired dimension. However, the upper metal layer 29 may not be provided.

As illustrated in FIGS. 3 and 5, vertical biasing layers (magnetic domain control layers) 32 for applying a biasing magnetic field to the free layer 27 for magnetic domain control are formed on both sides of the magneto-resistive layer in the Z-axis direction. The vertical biasing layers 32 are formed, for example, of a hard magnetic material such as Cr/CoPt (cobalt platinum alloy), Cr/CoCrPt (cobalt chromium platinum alloy), TiW/CoPt, TiW/CoCrPt, or the like. Alternatively, each of the vertical biasing layers 32 may be, for example, a layer using an switched connection in which a soft magnetic layer and an anti-ferromagnetic layer are laminated. An insulating layer 34 is formed below each of vertical biasing layers 32. The insulating layer 34 also intervenes between end faces of the associated vertical biasing layer 32 and layers 24-28 on the +Z-side and −Z-side, such that the layers 24-28 are not electrically short-circuited by the vertical biasing layer 32. Also, in a region where the vertical biasing layers 32, 34 are not formed, an insulating layer 30 is formed between the lower metal layer 22 and the upper metal layer 29. The insulating layer 30 covers an end surface on the −Y side of the layers 24-28. The insulating layers 34, 30 are made of $Al_2O_3$, $SiO_2$ or the like. Alternatively, both or one of the insulating layers 34, 30 may be made of a nitride or the like such as AlN.

It should be noted that the layers 24-28 substantially exactly overlap one another, and a region in which they overlap one another functions as an effective region effectively involved in detection of magnetism in the magneto-resistive layer (in the first embodiment, a region in which a current flows in a direction substantially perpendicular to the film plane in the magneto-resistive layer).

As illustrated in FIGS. 2 and 3, the inductive magnetic transducing device 3 comprises the upper electrode 31 which is additionally used as a lower magnetic layer for the device 3; an upper magnetic layer 36; a coil layer 37; a write gap layer 38 made of alumina or the like; an insulating layer 39 made of a thermosetting photoresist (for example, an organic resin such as a novolac resin); a protection layer 40 made of alumina or the like, and the like. NiFe, FeN, FeCo, CoFeNi or the like, for example, is used as a material for the upper magnetic layer 36. Leading ends of the upper electrode 31, which is additionally used as the lower magnetic layer, and the upper magnetic layer 36 are formed as a lower pole 31a and an upper pole 36a which oppose each other through the write gap layer 38 made of alumina or the like in an infinitesimal thickness. The lower pole 31a and upper pole 36a write information on a magnetic recording medium. The upper electrode 31, which is additionally used as the lower magnetic layer, and the upper magnetic layer 36 are coupled to each other at a joint 41 at which a yoke is opposite to the lower pole 31a and upper pole 36a so as to complete a magnetic circuit. Within the insulating layer 39, a coil layer 37 is formed such that it is spirally wound around the joint 41 of the yoke. The coil layer 37 has both ends electrically connected to the bonding pads 5c, 5d. The coil layer 37 is arbitrary in the number of turns and the number of layers. Also, the inductive magnetic transducing device 3 may be arbitrary in structure. The upper electrode 31 may be divided into two layers across an insulating layer made of $Al_2O_3$, $SiO_2$ or the like in order to separate the role of the lower magnetic layer in the inductive magnetic transducing device 3 from the role of the upper electrode in the TMR device 2.

The protection film 4a is formed to cover the end faces of the respective layers 16, 21, 22, 24-29, 31, 32, 34, 36, 30 on the ABS side, and the surface of the ceramic base 15 on the ABS side through the underlying layers 4b and a layer 4c, as illustrated in FIGS. 1 to 4. Here, for convenience of description, the layer 4c is referred to as the "variation reducing layer." The underlying layer 4b is formed beneath the protection film 4a, while the variation reducing layer 4c is interposed between the underlying layer 4b and the end faces of the respective layers 16, 21, 22, 24-49, 31, 32, 34, 36, 40 on the ABS side and the surface of the ceramic base 15 on the ABS side and is in contact with these surfaces. In the first embodiment, the variation reducing layer 4c is formed to exactly overlap with the protection film 4a and the underlying layer 4b therefor. However, the formation of the variation reducing layer 4c is not so limited, but the variation reducing layer 4c may be formed, for example, in a region which covers only the end face of the tunnel barrier layer 26 on the ABS side. In addition, one or more layers may be formed between the variation reducing layer 4c and underlying layer 4b.

In the first embodiment, while a DLC film is formed as the protection film 4a, a film made of another material can be used for the protection film 4a. The underlying layer 4b is made of a material except for an oxide, while the variation reducing layer 4c is made of an oxide of a metal or an oxide of a semiconductor. In the first embodiment, the variation reducing layer 4c is made of the same material in any part thereof. Specifically, the underlying layer 4b is made, for example, of Si or Sic, while the variation reducing layer 4c is made, for example, of an oxide of a material selected from a group consisting of Al, Si, Ti, V, Cr, Mn, Fe, Ni, Co, Cu, Zn, Zr, Nb, Mo, Hf, Ta, and W.

Figure 7:
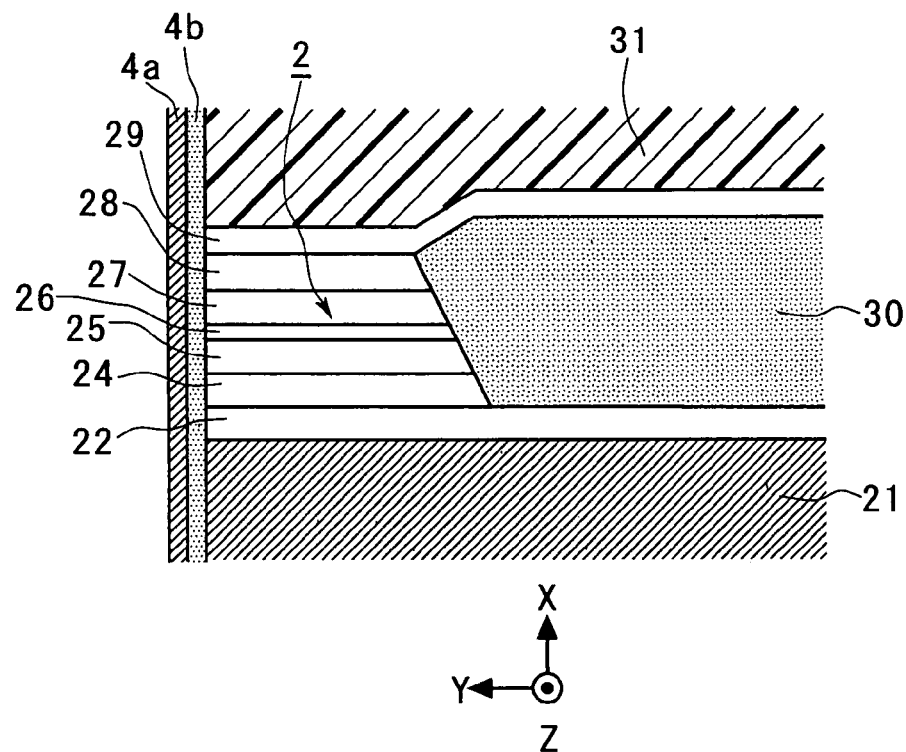
FIG. 7 is an enlarged cross-sectional view schematically illustrating a main portion of a magnetic head according to a comparative example.

Now, a magnetic head according to a comparative example, which is compared with the magnetic head according to the first embodiment, will be described with reference to FIG. 7. FIG. 7 is an enlarged cross-sectional view schematically illustrating a main portion of the magnetic head according to the comparative example, and corresponds to FIG. 4. In FIG. 7, components identical or corresponding to those in FIG. 4 are designated by the same reference numerals, and repeated description thereon is omitted.

The magnetic head according to the comparative example illustrated in FIG. 7 differs from the magnetic head according to the first embodiment only in that no variation reducing layer 4c is formed, and that the underlying layer 4b is in contact with the end faces of the respective layers 16, 21, 22, 24-29, 31, 32, 34, 36, 40 on the ABS side and the surface of the ceramic base 15 on the ABS side. In this comparative example, the underlying layer 4b is made of Si.

In the magnetic head according to the comparative example, the resistance of a TMR device 2 after the magnetic head has been left in a high temperature environment is relatively largely reduced as compared with the resistance of the TMR device 2 before the magnetic head was left in the high temperature environment. In contrast, with the magnetic head according to the first embodiment, the resistance of the TMR device 2 after the magnetic head has been left in a high temperature environment does not significantly vary as compared with the resistance of the TMR device 2 before the magnetic head was left in the high temperature environment. These facts were confirmed by the experiment described later.

Figure 6:
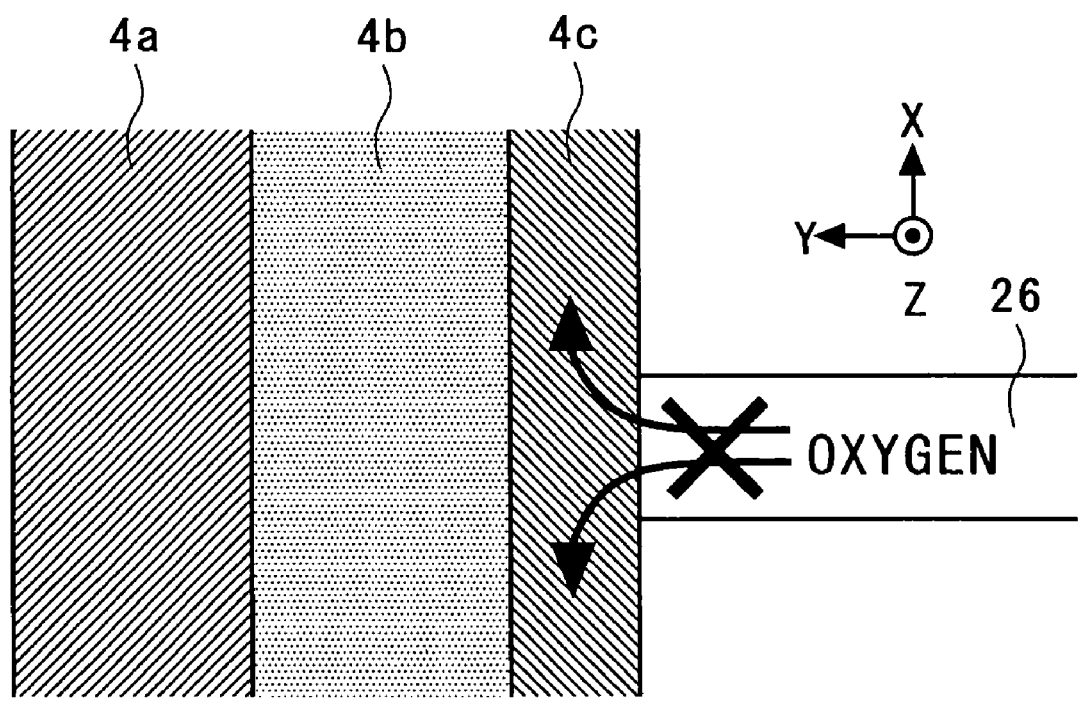
FIG. 6 is a diagram schematically representing the behavior of oxygen within a tunnel barrier layer of the magnetic head illustrated in FIGS. 1-5 in a high temperature environment.
Figure 8:
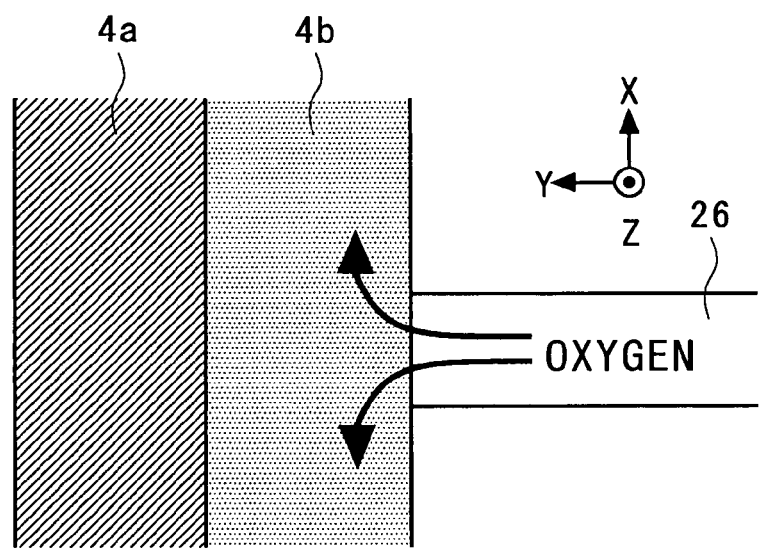
FIG. 8 is a diagram schematically representing the behavior of oxygen within a tunnel barrier layer of the magnetic head according to a comparative example in a high temperature environment.

Presumably, the foregoing results were observed for the following cause. In the magnetic head according to the comparative example, the underlying layer 4b made of Si, which has a relatively high binding ability with oxygen, is in contact with the end face of the tunnel barrier layer 26, which is an oxide layer, on the ABS side, so that when the magnetic head is left in a high temperature environment, oxygen present in the tunnel barrier layer 26 migrates into the underlying layer 4b, as illustrated in FIG. 8, to reduce the oxygen in the tunnel barrier layer 26 and therefore reduce the resistance of the tunnel barrier layer 26, resulting in a lower resistance of the whole TMR device 2 to cause relatively large variations in the resistance of the TMR device 2, as supposed by the inventors. In contrast, with the magnetic head according to the first embodiment, the variation reducing layer 4c, which is made of a metal or a semiconductor (i.e., an oxide of a metal or an oxide of a semiconductor) that has been already bound to oxygen, is in contact with the end face of the tunnel barrier layer 26 on the ABS side, so that even if the magnetic head is left in a high temperature environment, oxygen present in the tunnel barrier layer 26 is less prone to go out of the tunnel barrier layer 26, as illustrated in FIG. 6, and remains within the tunnel barrier layer 26. Thus, the resistance of the tunnel barrier layer 26 is not significantly reduced to cause less variations in the resistance of the TMR device 2, as supposed by the inventors.

FIG. 6 is a diagram schematically representing the behavior of the oxygen within the tunnel barrier layer 26 of the magnetic head according to the first embodiment in a high temperature environment. FIG. 8 is a diagram schematically representing the behavior of the oxygen within the tunnel barrier layer 26 of the magnetic head according to the comparative example illustrated in FIG. 7 in a high temperature environment.

Next, description will be made on a magnetic head manufacturing method according to a second embodiment of the present invention. This magnetic head manufacturing method is provided for manufacturing the magnetic head according to the first embodiment.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

Figure 10A:
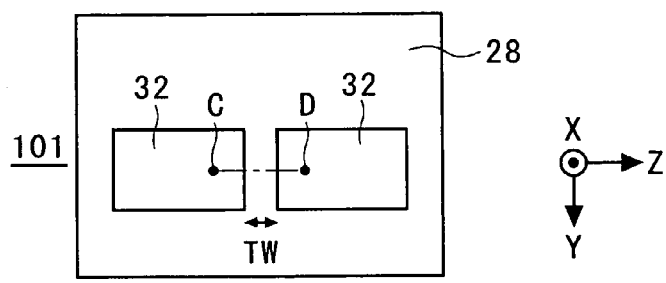
FIGS. 10A and 10B are diagrams schematically illustrating a further step in the magnetic head manufacturing method according to the second embodiment of the present invention.
Figure 10B:
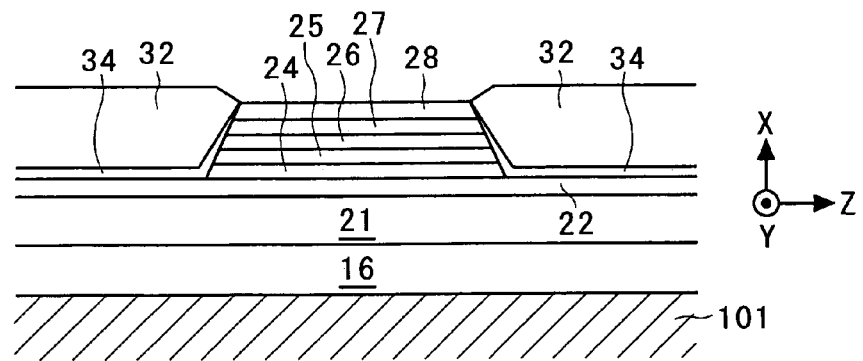
Figure 11A:
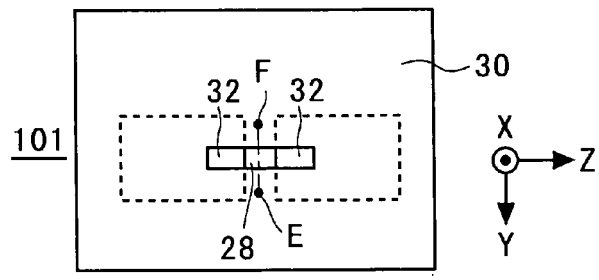
FIGS. 11A and 11B are diagrams schematically illustrating a further step in the magnetic head manufacturing method according to the second embodiment of the present invention.
Figure 11B:
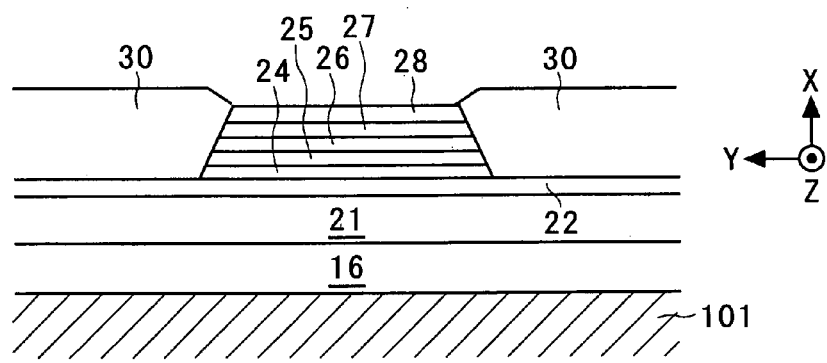

The outline of the wafer process will be described with reference to FIGS. 9 to 12. FIGS. 9 to 12 are diagrams schematically illustrating respective steps which make up the wafer process, wherein FIGS. 9A, 10A, 11A, and 12A are general plan views, respectively; FIG. 9B is a general cross-sectional view taken along a line C-D in FIG. 9A; FIG. 10B is a general cross-sectional view taken along a line C-D in FIG. 10A; FIG. 11B is a general cross-sectional view taken along a line E-F in FIG. 11A; and FIG. 12B is a general cross-sectional view taken along a line E-F in FIG. 12A. In FIG. 10A, TW indicates the width of a track defined by the TMR device 2.

Figure 9A:
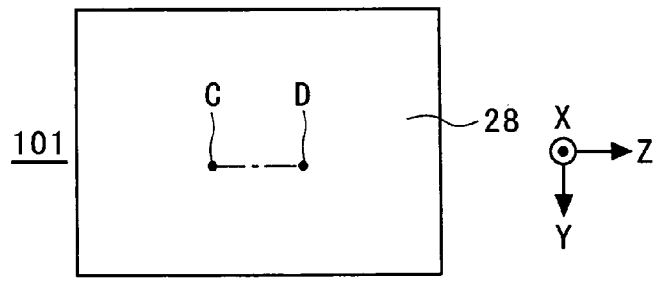
FIGS. 9A and 9B are diagrams schematically illustrating a step in a magnetic head manufacturing method according to a second embodiment of the present invention.
Figure 9B:
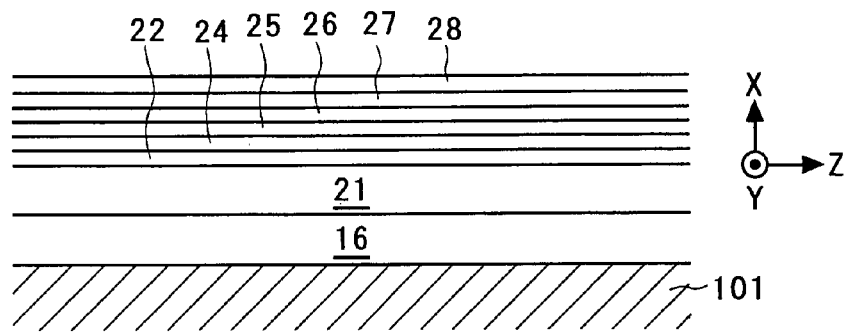

First, in the wafer process, the underlying layer 16, lower electrode 21, lower metal layer 22, pinning layer 24, pinned layer 25, tunnel barrier layer 26, free layer 27, and cap layer 28 are sequentially laminated on the wafer 101 (FIGS. 9A and 9B). In this event, the lower electrode 21 is formed, for example, by a plating method, while the other layers are formed, for example, by a sputtering method. Subsequently, the substrate in this state is once left in the atmosphere. In this event, an oxide film (not shown) is formed on the top face of the cap layer 28.

Next, the pinning layer 24, pinned layer 25, tunnel barrier layer 26, free layer 27, cap layer 28 and the oxide film on the cap layer 28 are partially removed for patterning by first ion milling. Next, the insulating layer 34 and vertical biasing layers 32 are formed in the removed portions by a lift-off method (FIGS. 10A and 10B).

Next, the pinning layer 24, pinned layer 25, tunnel barrier layer 26, free layer 27, cap layer 28, oxide film (not shown) on the cap layer 28 as mentioned above, insulating layer 34, and vertical biasing layers 32 are partially removed for patterning by second ion milling, while leaving a strip portion which has a necessary width (width in the Y-axis direction) with respect to the height direction of the TMR device 2 and extends in the Z-axis direction by a predetermined distance. Subsequently, the insulating layer 30 is formed in the removed portions by a lift-off method (FIGS. 11A and 11B).

Next, the oxide film formed on the top face of the cap layer 28 is removed for cleaning by dry etching such as sputter etching, ion beam etching or the like in the same vacuum chamber in which the upper metal layer 29 is formed.

Figure 12A:
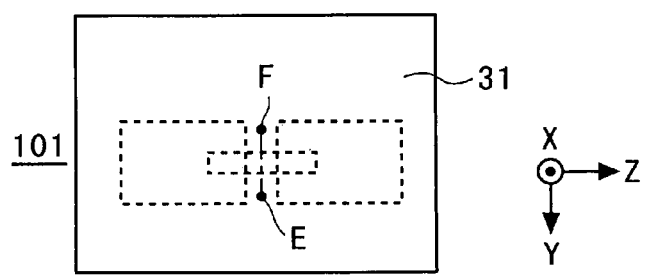
FIGS. 12A and 12B are diagrams schematically illustrating a further step in the magnetic head manufacturing method according to the second embodiment of the present invention.
Figure 12B:
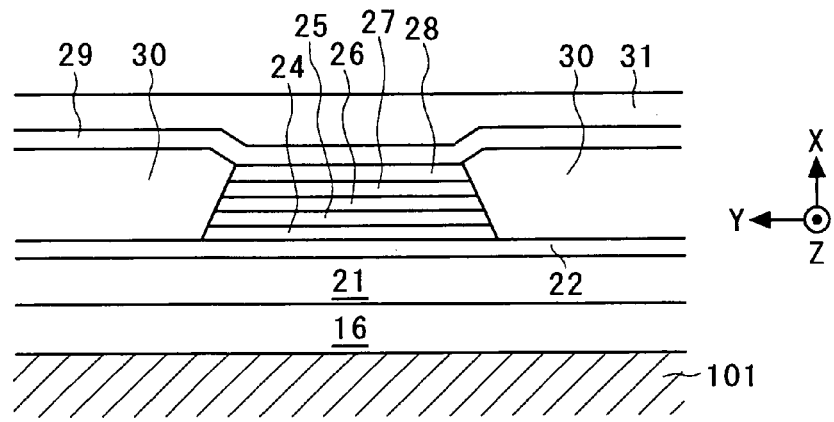

Subsequently, the upper metal layer 29 is formed by a sputtering method or the like, and the upper electrode 31 is formed by a plating method or the like (FIGS. 12A and 12B).

Finally, the write gap layer 38, coil layer 37, insulating layer 39, upper magnetic layer 36, and protection layer 40 are formed, and the electrodes 5a-5d and the like are formed. By now, the wafer process is completed.

Figure 13A:
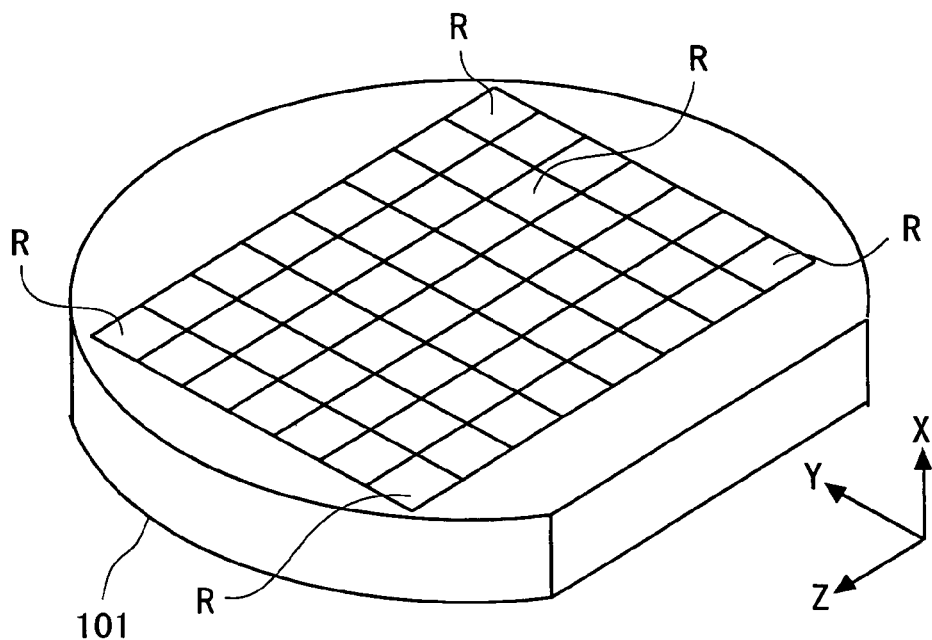
FIGS. 13A and 13B are general perspective views schematically illustrating further steps in the magnetic head manufacturing method according to the second embodiment of the present invention.

FIG. 13A illustrates the wafer 101 after the completion of the wafer process. Note that FIG. 13A illustrates only a region R of each magnetic head, and omits elements formed in the wafer 101.

Figure 13B:
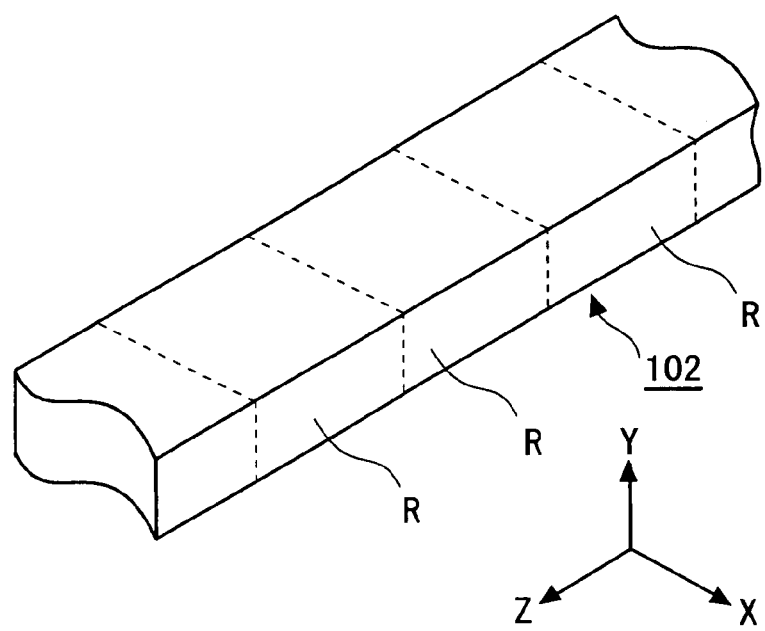

After the wafer process, the wafer 101 illustrated in FIG. 13A is cut by a diamond cutter or the like into each bar (bar-shaped magnetic head aggregate) 102 having a plurality of magnetic heads arranged in a line. FIG. 13B illustrates the bar 102. The top surface of the bar 102 parallel with an XZ-plane in FIG. 13B is the surface on the ABS side, and the end faces of the respective layers 16, 21, 22, 24-29, 31, 32, 34, 36, 40, and the like appear on this surface. The electrodes 5a-5d and the like in FIG. 1 appear on the surface parallel with a YZ-plane in FIG. 13B and seen in front. However, the illustration of these elements are omitted in FIG. 13B. FIGS. 13A and 13B are general perspective views schematically illustrating a bar cutting step after the wafer process.

Next, the bar 102 illustrated in FIG. 13B is lapped (mechanically lapped) on its ABS side for defining the height (MR height) of the TMR device 2 and the like. In this processing, the bar 102 is set, for example, to a fixing jig, and pressed onto a surface plate with a suspension containing diamond abrasive grain being dropped onto the surface plate. Then, the surface plate is rotated to lap the surface of the bar 102 on the ABS side.

Figure 14:
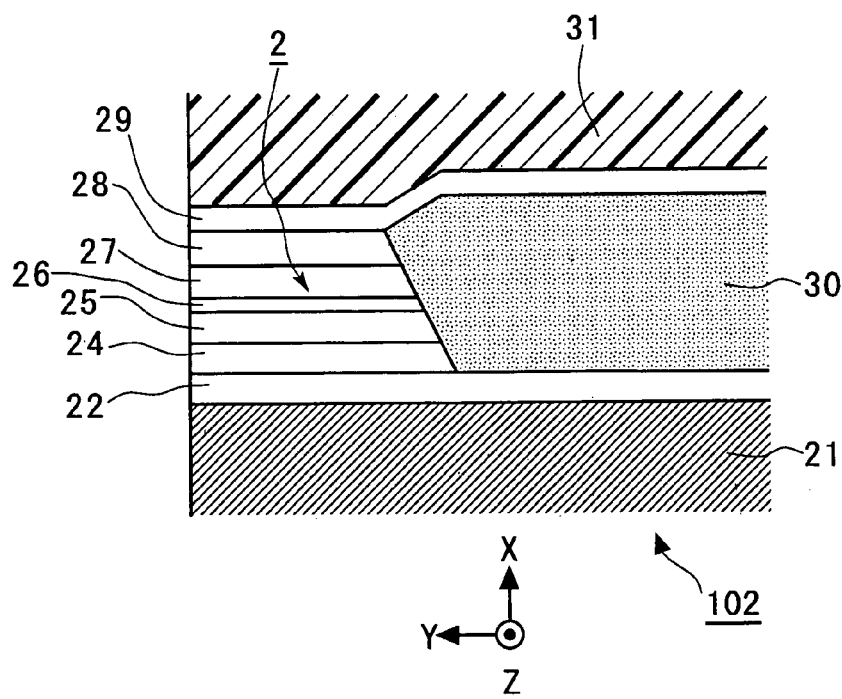
FIG. 14 is a cross-sectional view schematically illustrating a further step in the magnetic head manufacturing method according to the second embodiment of the present invention.

FIG. 14 illustrates the bar 104 after the lapping. FIG. 14 is a general cross-sectional view taken along a plane parallel with an XY-plane, schematically illustrating the bar 102 after the lapping. Typically, smears (metal chips and the like produced during the lapping) are found on the surface (left-hand end face in FIG. 14) of the bar 102 shown in FIG. 14 on the ABS side after the lapping. However, the illustration of such smears is omitted in FIG. 14.

Subsequently, the surface of the bar 102 on the ABS side after the lapping is etched for removing the smears. For this purpose, for example, dry etching such as sputter etching, ion beam etching or the like may be employed. However, the etching may not be necessarily performed if the smears do not affect the characteristics of the TMR device 2.

Next, after the bar 102 is once left in the atmosphere, the bar 102 is etched by dry etching such as sputter etching, ion beam etching or the like for removing a surface oxide layer (an oxide layer formed on the surface of the bar 102 on the ABS side due to the temporary placement of the bar 102 in the atmosphere), cleaning the surface, and the like in the same vacuum chamber in which a metal or a semiconductor layer, which is to be eventually transformed into the variation reducing layer 4c, is deposited. In the first embodiment, the bar 102 is etched to completely remove the surface oxide layer. However, in the present invention, the bar 102 may be etched such that the surface oxide layer is not completely removed but the surface oxide layer remains. In this event, as is the case with a fourth embodiment, later described, the surface oxide layer become a layer in contact with the end face of the magneto-resistive device on the ABS side.

Next, a layer of a metal or a semiconductor (for example, Al, Si, Ti, V, Cr, Mn, Fe, Ni, Co, Cu, Zn, Zr, Nb, Mo, Hf, Ta, or W), which is to be transformed into the variation reducing layer 4c, is deposited on the surface of the bar 102 on the ABS side by a sputtering method or the like.

Figure 15:
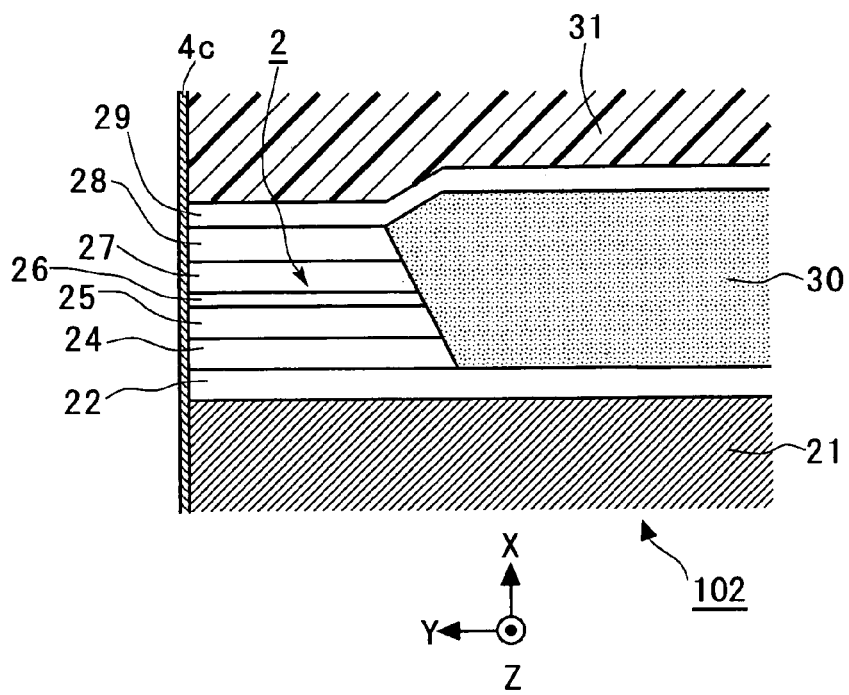
FIG. 15 is a cross-sectional view schematically illustrating a further step in the magnetic head manufacturing method according to the second embodiment of the present invention.

Subsequently, the bar 102 is left in the atmosphere to oxidize the metal or semiconductor layer deposited on the surface of the bar 102 on the ABS side by natural oxidization, thereby forming the variation reducing layer 4c made of an oxide of a metal or an oxide of a semiconductor (FIG. 15).

Next, the resulting bar 102 is etched for cleaning the surface and the like by dry etching such as sputter etching, ion beam etching or the like in the same vacuum chamber in which the underlying layer 4b and protection film 4a are deposited. Next, the underlying layer 4b made, for example, of Si is deposited on the variation reducing layer 4c by a sputtering method or the like, and a DLC film serving as the protection film 4a is further deposited on the underlying layer 4b by a plasma CVD method or the like.

Subsequently, regions on the surface of the bar 102 on the ABS side are selectively etched except for regions of rails 11, 12 to form the rails 11, 12. Finally, the bar 102 is cut by machining into individual magnetic heads. In this manner, the magnetic heads according to the first embodiment are completed, as illustrated in FIGS. 1 to 5.

Even with the magnetic head according to the first embodiment, if an employed manufacturing method involves attaching of excessive oxygen on the end face of the TMR device 2 on the ABS side during the manufacturing, the excessive oxygen will migrate into the tunnel barrier layer 26 when the resulting magnetic head is left in a high temperature environment, thereby increasing the resistance of the TMR device 2 to cause relatively large variations in the resistance.

In contrast, as described above, in the magnetic head manufacturing method according to the second embodiment, after a metal or a semiconductor layer, which is to be transformed into the variation reducing layer 4c, is deposited on the end face of the TMR device 2 on the ABS side, the metal or semiconductor layer is oxidized to form the variation reducing layer 4c. Accordingly, it is possible to prevent excessive oxygen from attaching to the end face of the TMR device 2 on the ABS side. Therefore, in the magnetic head manufactured in accordance with the second embodiment, it is possible to prevent variations in the resistance of the TMR device 2 due to an increase in the resistance, as well as to prevent variations in the resistance of the TMR device 2 due to a reduction in the resistance, even if the magnetic head in use is left in a high temperature environment.

In the present invention, the manufacturing method according to the second embodiment may be modified as described below. Respective modifications described below may also be applied to the second embodiment by arbitrarily combining them as appropriate.

First, the dry etching for removing smears, and the dry etching for cleaning the surface and the like before the deposition of a metal or a semiconductor layer which is to be transformed into the variation reducing layer 4c may not be performed at different times, but dry etching may be performed once for both purposes.

Second, the dry etching for removing smears and the deposition of a metal or a semiconductor layer which is to be transformed into the variation reducing layer 4c may be performed in the same vacuum chamber in order to prevent the bar from exposing to the atmosphere.

Third, the dry etching may not be performed for cleaning the surface and the like before the deposition of a metal or a semiconductor layer which is to be the variation reducing layer 4c.

Fourth, the oxidization of the metal or semiconductor layer to be transformed into the variation reducing layer 4c is not limited to the natural oxidization, but may be forced oxidization such as plasma oxidization, radical oxidization, ion beam oxidization, exposure to ozone, or the like. Such forced oxidization may be performed in the same vacuum chamber in which the underlying layer 4b is deposited, or the bar may be once left in the atmosphere before the deposition of the underlying layer 4b and after the forced oxidization.

Fifth, the dry etching for cleaning the surface and the like may not be performed before the deposition of the underlying layer 4b.

Sixth, the bar may be thermally treated at temperatures equal to or higher than the highest temperature in an environment in which the magnetic head is actually used, after the deposition of the protection film 4a. It is preferable that the bar head is thermally treated positively beforehand in this way, because oxygen is more prevented from going into or out of the tunnel barrier layer 26 in an actually used temperature range to reduce variations in the resistance of the TMR device 2.

Next, description will be made on a magnetic head manufacturing method according to a third embodiment of the present invention. This magnetic head manufacturing method is also provided for manufacturing the magnetic head according to the first embodiment.

The magnetic head manufacturing method according to the third embodiment differs from the magnetic head manufacturing method according to the second embodiment only in the following aspects, and repetitive description is omitted.

The third embodiment is also identical to the second embodiment until the surface of the lapped bar 102 on the ABS side is etched for removing smears. However, if the smears do not affect the characteristics of the TMR device 2, the etching for removing smears may not be necessarily performed.

Subsequently, in the third embodiment, after the bar 102 is once left in the atmosphere, the bar 102 is etched for cleaning the surface and the like by dry etching such as sputter etching, ion beam etching or the like in the same vacuum chamber in which the variation reducing layer 4c is deposited.

Next, ion beam deposition or sputtering is performed using an oxide of a metal or a semiconductor (for example, Al, Si, Ti, V, Cr, Mn, Fe, Ni, Co, Cu, Zn, Zr, Nb, Mo, Hf, Ta, or W) as a target without using oxygen for a process gas to deposit the variation reducing layer 4c on the surface of the bar 102 on the ABS side.

Next, after the bar 102 is etched for cleaning the surface and the like by dry etching such as sputter etching, ion beam etching or the like in the same vacuum chamber in which the variation reducing layer 4c has been deposited, the underlying layer 4b made, for example, of Si is deposited on the variation reducing layer 4c by a sputtering method or the like. Further, a DLC film serving as the protection film 4a is deposited on the underlying layer 4b by a plasma CVD method or the like.

Subsequently, regions on the surface of the bar 102 on the ABS side are selectively etched except for regions of rails 11, 12 to form the rails 11, 12. Finally, the bar 102 is cut by machining into individual magnetic heads. In this manner, the magnetic heads according to the first embodiment are completed, as illustrated in FIGS. 1 to 5.

As described above, in the magnetic head manufacturing method according to the third embodiment, the variation reducing layer 4c is deposited by performing the ion beam deposition or sputtering using an oxide of a metal or an oxide of a semiconductor as a target without using oxygen for a process gas. Accordingly, it is possible to prevent excessive oxygen from attaching to the end face of the TMR device 2 on the ABS side. Therefore, in the magnetic head manufactured in accordance with the third embodiment, it is possible to prevent variations in the resistance of the TMR device 2 due to an increase in the resistance, as well as to prevent variations in the resistance of the TMR device 2 due to a reduction in the resistance, even if the magnetic head in use is left in a high temperature environment. Also, the second embodiment requires the step of oxidizing a metal or a semiconductor layer, after it has been deposited, for forming the variation reducing layer 4c, while the third embodiment does not need a special oxidization step and can therefore facilitate the manufacturing and reduce the cost.

In the present invention, the manufacturing method according to the third embodiment may be modified as described below. Respective modifications described below may also be applied to the third embodiment by arbitrarily combining them as appropriate.

First, the dry etching for removing smears, and the dry etching for cleaning the surface and the like before the deposition of the variation reducing layer 4c may not be performed at different times, but dry etching may be performed once for both purposes.

Second, the dry etching for removing smears and the deposition of the variation reducing layer 4c may be performed in the same vacuum chamber in order to prevent the bar from exposing to the atmosphere.

Third, the dry etching may not be performed for cleaning the surface and the like before the deposition of the variation reducing layer 4c.

Fourth, the bar 102 may be once left in the atmosphere after the deposition of the variation reducing layer 4c and before the deposition of the underlying layer 4b.

Fifth, the dry etching for cleaning the surface and the like may not be performed before the deposition of the underlying layer 4b.

Sixth, the bar may be thermally treated at temperatures equal to or higher than the highest temperature in an environment in which the magnetic head is actually used, after the deposition of the protection film 4a. It is preferable that the bar head is thermally treated positively beforehand in this way, because oxygen is more prevented from going into or out of the tunnel barrier layer 26 in an actually used temperature range to reduce variations in the resistance of the TMR device 2.

Next, a magnetic head according to a fourth embodiment of the present invention will be described with reference to FIG. 16.

Figure 16:
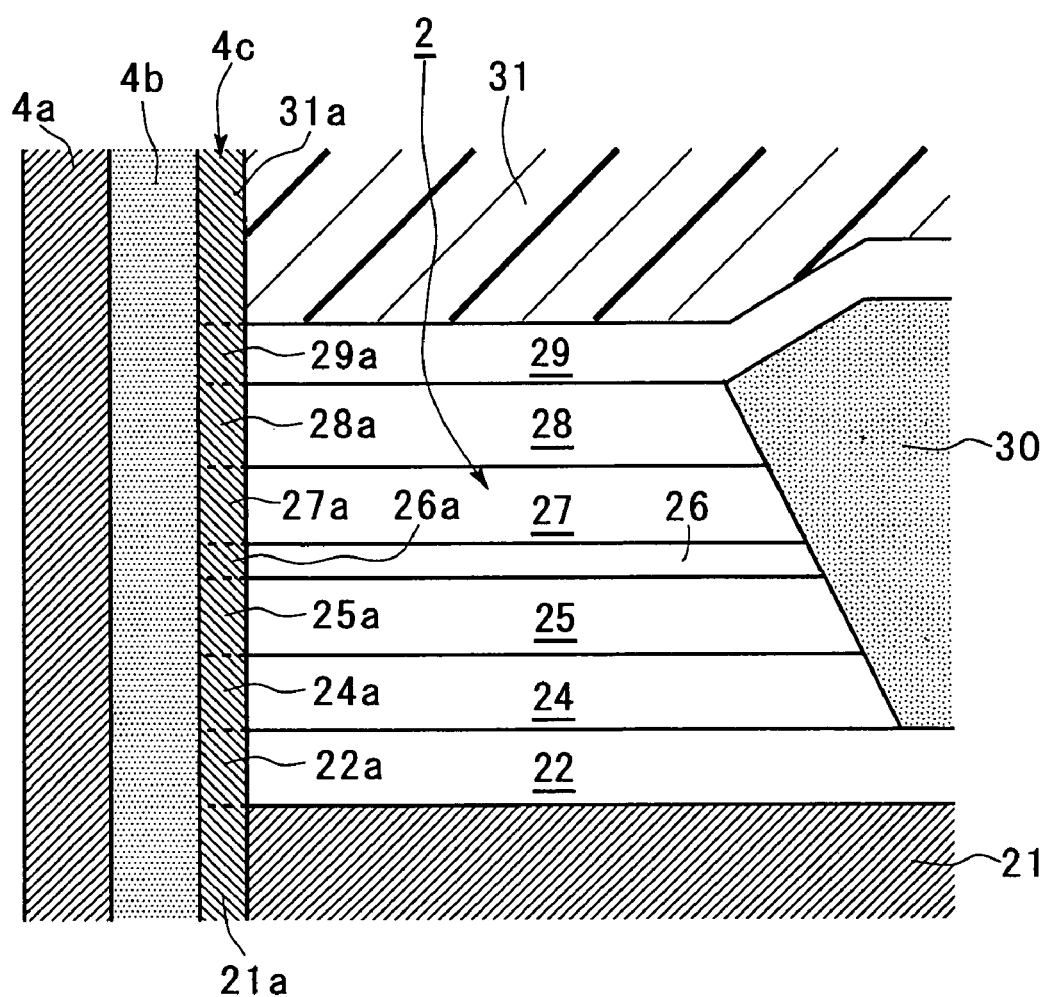
FIG. 16 is an enlarged cross-sectional view schematically illustrating a main portion of a magnetic head according to a fourth embodiment of the present invention.

FIG. 16 is an enlarged cross-sectional view schematically illustrating a main portion of a magnetic head according to a fourth embodiment of the present invention, and corresponds to FIG. 4. In FIG. 16, components identical or corresponding to those in FIG. 4 are designated by the same reference numerals, and repetitive description thereon is omitted.

The magnetic head according to the fourth embodiment differs from the magnetic head according to the first embodiment only in the composition of the variation reducing layer 4c. In the first embodiment, the variation reducing layer 4c is made of the same material in any part thereof. In the fourth embodiment, on the other hand, respective portions 21a, 22a, 24a-29a, 31a of the variation reducing layer 4c which cover the layers 21, 22, 24-29, 31, respectively, are made of materials which are determined in accordance with the materials of the constituent layers of the TMR device 2 which are covered with the respective portions, respectively. Specifically, the portion 26a of the variation reducing layer 4c which covers the end face of the tunnel barrier layer 26 on the ABS side is made of the same element as the element which participates in making the tunnel barrier layer 26, and is made of an oxide of a metal or an oxide of a semiconductor. The portion 25a of the variation reducing layer 4c which covers the end face of the pinned layer 25 on the ABS side is made of an oxide of the same metal as the metal which participates in making the pinned layer 25. Likewise, the respective portions 21a, 22a, 24a, 27a-29a, 31a of the variation reducing layer 4c which cover the layers 21, 22, 24, 27-29, 31, respectively, are made of oxides of the same metals as the metals which participate in making the constituent layers of the TMR device 2 covered by the respective portions, respectively.

The fourth embodiment also provides similar advantages to those of the first embodiment.

Next, description will be made on a magnetic head manufacturing method according to a fifth embodiment of the present invention. This magnetic head manufacturing method is provided for manufacturing the magnetic head according to the fourth embodiment.

The magnetic head manufacturing method according to the fifth embodiment differs from the magnetic head manufacturing method according to the second embodiment only in the following aspects, and repetitive description is omitted.

The fifth embodiment is identical to the second embodiment until the surface of the lapped bar 102 on the ABS side is etched for removing smears.

Subsequently, in the fifth embodiment, the bar 102 is left in the atmosphere to oxidize the surface of the bar 102 on the ABS side by natural oxidization to form the variation reducing layer 4c, described in connection with the fourth embodiment, as a surface oxide layer on the ABS side. By oxidizing the surface of the bar 102 on the ABS side, end portions of the respective layers formed to make up the TMR device 2 are oxidized on the ABS side.

Next, the bar 102 is etched for cleaning the surface and the like by dry etching such as sputter etching, ion beam etching or the like in the same vacuum chamber in which the underlying layer 4b is deposited. In the fifth embodiment, this etching is performed such that the surface oxide layer (the variation reducing layer 4c in fifth embodiment) remains.

Next, the underlying layer 4b made, for example, of Si is deposited on the variation reducing layer 4c by a sputtering method or the like, and a DLC film serving as the protection film 4a is further deposited on the underlying layer 4b by a plasma CVD method or the like.

Subsequently, regions on the surface of the bar 102 on the ABS side are selectively etched except for regions of rails 11, 12 to form the rails 11, 12. Finally, the bar 102 is cut by machining into individual magnetic heads. In this manner, the magnetic head according to the fourth embodiment is completed, as illustrated in FIG. 16.

In the magnetic head manufacturing method according to the fifth embodiment, since the surface of the bar 102 on the ABS side is oxidized to form the variation reducing layer 4c as described above, the end face of the TMR device 2 on the ABS side becomes the surface where the progress of the surface oxidization stops. Thus, oxygen within the oxide layer (tunnel barrier layer 26) of the TMR device 2 is less prone to migrate into the underlying layer 4b, and it is possible to prevent oxygen from excessively attaching to the end face of the TMR device 2 on the ABS side. Therefore, in the magnetic head manufactured in accordance with the fifth embodiment, it is possible to prevent variations in the resistance of the TMR device 2 due to an increase in the resistance, as well as to prevent variations in the resistance of the TMR device 2 due to a reduction in the resistance, even if the magnetic head in use is left in a high temperature environment. Also, the second and third embodiments require the step of adding a predetermined material from the outside to the layers formed to make up the TMR device 2, for forming the variation reducing layer 4c, while the fifth embodiment does not need such a step and can therefore facilitate the manufacturing and reduce the cost.

In the present invention, the manufacturing method according to the fifth embodiment may be modified as described below. Respective modifications described below may also be applied to the fifth embodiment by arbitrarily combining them as appropriate.

First, the dry etching for removing smears may not be necessarily performed.

Second, the oxidization of the surface of the bar 102 on the ABS side for forming the variation reducing layer 4c is not limited to the natural oxidization, but may be forced oxidization such as plasma oxidization, radical oxidization, ion beam oxidization, exposure to ozone, or the like. Such forced oxidization may be performed in the same vacuum chamber in which the underlying layer 4b is deposited, or the bar may be once left in the atmosphere before the deposition of the underlying layer 4b and after the forced oxidization.

Third, the dry etching for cleaning the surface and the like may not be performed before the deposition of the underlying layer 4b.

Fourth, the bar may be thermally treated at temperatures equal to or higher than the highest temperature in an environment in which the magnetic head is actually used, after the deposition of the protection film 4a. It is preferable that the bar head is thermally treated positively beforehand in this way, because oxygen is more prevented from going into or out of the tunnel barrier layer 26 in an actually used temperature range to reduce variations in the resistance of the TMR device 2.

Fifth, the protection film 4a may be directly formed on the variation reducing layer 4c without forming the underlying layer 4b.

Next, description will be made on a magnetic head manufacturing method according to a sixth embodiment of the present invention. This magnetic head manufacturing method is provided for manufacturing a magnetic head which is a modification to the aforementioned magnetic head according to the comparative example illustrated in FIG. 7.

The magnetic head manufactured by the manufacturing method according to the sixth embodiment differs from the magnetic head according to the comparative example illustrated in FIG. 7 only in that the underlying layer 4b is made of an oxide (for example, $SiO_2$, $Al_2O_3$, or the like) of a metal or a semiconductor. Therefore, this magnetic head has the underlying layer 4b made of an oxide of a metal or an oxide of a semiconductor, like the variation reducing layer 4c in the first embodiment, so that the underlying layer 4b serves the same function as the variation reducing layer 4c. Therefore, as is the case with the magnetic head according to the first embodiment, even if the magnetic head is left in a high temperature environment, oxygen present in the tunnel barrier layer 26 is less prone to go out of the tunnel barrier layer 26, as illustrated in FIG. 6, and remains within the tunnel barrier layer 26. Thus, the resistance of the tunnel barrier layer 26 is not significantly reduced to cause less variations in the resistance of the TMR device 2.

However, even with such a magnetic head, if an employed manufacturing method involves attaching of excessive oxygen on the end face of the TMR device 2 on the ABS side during the manufacturing, the excessive oxygen will migrate into the tunnel barrier layer 26, when the resulting magnetic head is left in a high temperature environment, thereby increasing the resistance of the TMR device 2 to cause relatively large variations in the resistance.

In the magnetic head manufacturing method according to the sixth embodiment, the magnetic head manufacturing method according to the second embodiment is modified in the following manner.

The sixth embodiment is identical to the second embodiment until the surface of the lapped bar 102 on the ABS side is etched for removing smears. However, if the smears do not affect the characteristics of the TMR device 2, the etching for removing smears may not be necessarily performed.

Next, after the bar 102 is once left in the atmosphere, the bar 102 is etched by dry etching such as sputter etching, ion beam etching or the like for cleaning the surface and the like in the same vacuum chamber in which a metal or a semiconductor layer, which is to be eventually transformed into the underlying layer 4b, is deposited.

Next, a layer of a metal or a semiconductor (for example, Al, Si, or the like), which is to be transformed into the underlying layer 4b, is deposited on the surface of the bar 102 on the ABS side by a sputtering method or the like.

Subsequently, the bar 102 is left in the atmosphere to oxidize the metal or semiconductor layer deposited on the surface of the bar 102 on the ABS side by natural oxidization, thereby forming the underlying layer 4b made of an oxide of the metal or an oxide of semiconductor. Next, a DLC film serving as the protection film 4a is deposited on the underlying layer 4b by a plasma CVD method or the like.

Subsequently, regions on the surface of the bar 102 on the ABS side are selectively etched except for regions of rails 11, 12 to form the rails 11, 12. Finally, the bar 102 is cut by machining into individual magnetic heads. In this manner, the aforementioned magnetic head is completed.

As described above, in the magnetic head manufacturing method according to the sixth embodiment, after a metal or a semiconductor layer, which is to be transformed into the underlying layer 4b, is deposited on the end face of the TMR device 2 on the ABS side, the metal or semiconductor layer is oxidized to form the underlying layer 4b. Accordingly, it is possible to prevent excessive oxygen from attaching to the end face of the TMR device 2 on the ABS side. Therefore, in the magnetic head manufactured in accordance with the sixth embodiment it is possible to prevent variations in the resistance of the TMR device 2 due to an increase in the resistance, as well as to prevent variations in the resistance of the TMR device 2 due to a reduction in the resistance, even if the magnetic head in use is left in a high temperature environment.

In the present invention, the manufacturing method according to the sixth embodiment may be modified as described below. Respective modifications described below may also be applied to the sixth embodiment by arbitrarily combining them as appropriate.

First, the dry etching for removing smears, and the dry etching for cleaning the surface and the like before the deposition of a metal or a semiconductor layer which is to be transformed into the underlying layer 4b may not be performed at different times, but dry etching may be performed once for both purposes.

Second, the dry etching for removing smears and the deposition of a metal or a semiconductor layer which is to be transformed into the underlying layer 4b may be performed in the same vacuum chamber in order to prevent the bar from exposing to the atmosphere.

Third, the dry etching may not be performed for cleaning the surface and the like before the deposition of a metal or a semiconductor layer which is to be the underlying layer 4b.

Fourth, the oxidization of the metal or semiconductor layer to be transformed into the underlying layer 4b is not limited to the natural oxidization, but may be forced oxidization such as plasma oxidization, radical oxidization, ion beam oxidization, exposure to ozone, or the like. Such forced oxidization may be performed in the same vacuum chamber in which the protection film 4a is deposited, or the bar may be once left in the atmosphere before the deposition of the protection film 4a and after the forced oxidization.

Fifth, the bar may be thermally treated at temperatures equal to or higher than the highest temperature in an environment in which the magnetic head is actually used, after the deposition of the protection film 4a. It is preferable that the bar head is thermally treated positively beforehand in this way, because oxygen is more prevented from going into or out of the tunnel barrier layer 26 in an actually used temperature range to reduce variations in the resistance of the TMR device 2.

Next, description will be made on a magnetic head manufacturing method according to a seventh embodiment of the present invention. This magnetic head manufacturing method is provided for manufacturing the same magnetic head as that manufactured by the manufacturing method according to the sixth embodiment.

In the magnetic head manufacturing method according to the seventh embodiment, the magnetic head manufacturing method according to the third embodiment is modified in the following manner.

The seventh embodiment is also identical to the second embodiment until the surface of the lapped bar 102 on the ABS side is etched for removing smears. However, if the smears do not affect the characteristics of the TMR device 2, the etching for removing smears may not be necessarily performed.

Subsequently, in the seventh embodiment, after the bar 102 is once left in the atmosphere, the bar 102 is etched for cleaning the surface and the like by dry etching such as sputter etching, ion beam etching or the like in the same vacuum chamber in which the underlying layer 4b is deposited.

Next, ion beam deposition or sputtering is performed using an oxide of a metal or a semiconductor (for example, Al, Si, or the like) as a target without using oxygen for a process gas to deposit the underlying layer 4b on the surface of the bar 102 on the ABS side. Next, a DLC film serving as the protection film 4a is deposited on the underlying layer 4b by a plasma CVD method or the like.

Subsequently, regions on the surface of the bar 102 on the ABS side are selectively etched except for regions of rails 11, 12 to form the rails 11, 12. Finally, the bar 102 is cut by machining into individual magnetic heads. In this manner, the aforementioned magnetic head is completed.

As described above, in the magnetic head manufacturing method according to the seventh embodiment, the underlying layer 4b is deposited by performing the ion beam deposition or sputtering using an oxide of a metal or an oxide of a semiconductor as a target without using oxygen for a process gas. Accordingly, it is possible to prevent excessive oxygen from attaching to the end face of the TMR device 2 on the ABS side. Therefore, in the magnetic head manufactured in accordance with the seventh embodiment, it is possible to prevent variations in the resistance of the TMR device 2 due to an increase in the resistance, as well as to prevent variations in the resistance of the TMR device 2 due to a reduction in the resistance, even if the magnetic head in use is left in a high temperature environment. Also, the sixth embodiment requires the step of oxidizing a metal or a semiconductor layer, after it has been deposited, for forming the underlying layer 4b, while the seventh embodiment does not need a special oxidization step and can therefore facilitate the manufacturing and reduce the cost.

In the present invention, the manufacturing method according to the seventh embodiment may be modified as described below. Respective modifications described below may also be applied to the seventh embodiment by arbitrarily combining them as appropriate.

First, the dry etching for removing smears, and the dry etching for cleaning the surface and the like before the deposition of the underlying layer 4b may not be performed at different times, but dry etching may be performed once for both purposes.

Second, the dry etching for removing smears and the deposition of the underlying layer 4b may be performed in the same vacuum chamber in order to prevent the bar from exposing to the atmosphere.

Third, the dry etching may not be performed for cleaning the surface and the like before the deposition of the underlying layer 4b.

Fourth, the bar 102 may be once left in the atmosphere after the deposition of the underlying layer 4b and before the deposition of the protection film 4a.

Fifth, the bar may be thermally treated at temperatures equal to or higher than the highest temperature in an environment in which the magnetic head is actually used, after the deposition of the protection film 4a. It is preferable that the bar head is thermally treated positively beforehand in this way, because oxygen is more prevented from going into or out of the tunnel barrier layer 26 in an actually used temperature range to reduce variations in the resistance of the TMR device 2.

Next, a magnetic head according to a eighth embodiment of the present invention will be described with reference to FIGS. 17 to 19.

Figure 17:
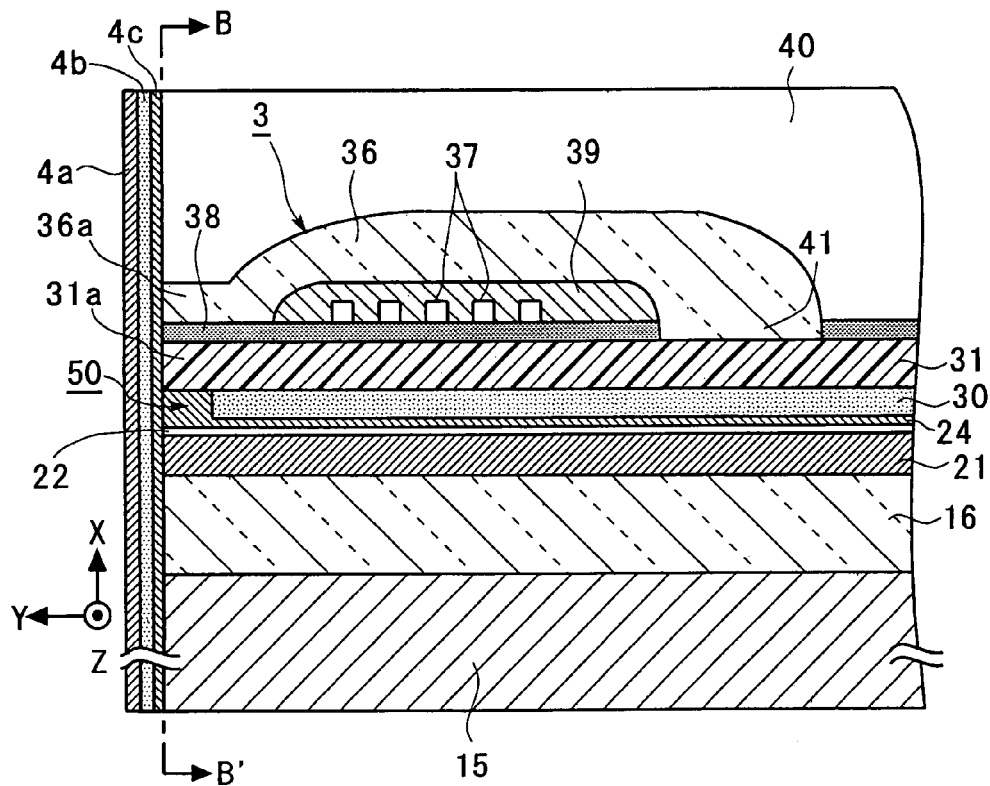
FIG. 17 is an enlarged cross-sectional view schematically illustrating a portion of a GMR device and an inductive magnetic transducing device in a magnetic head according to an eighth embodiment of the present invention.

FIG. 17 is an enlarged cross-sectional view schematically illustrating a portion of a GMR device 50 and an inductive magnetic transducing device 3 in a magnetic head according to an eighth embodiment of the present invention. FIG. 18 is a general sectional view taken along a line A-A' indicated by arrows in FIG. 17. FIG. 19 is a further enlarged view around the GMR device 50 in FIG. 18. FIGS. 17 to 19 correspond to FIGS. 2, 3, and 5, respectively. In FIGS. 17 to 19, components identical or corresponding to those in FIGS. 1 to 5 are designated by the same reference numerals, and repeated description thereon is omitted.

The magnetic head according to the eighth embodiment is basically similar to the magnetic head disclosed in JP-A-2003-60262 in that a magneto-resistive layer including a current path control layer 53 forms a part of a CPP-GMR head, and employs the variation reducing layer 4c as is the case with the first embodiment.

The magnetic head according to the eighth embodiment differs from the magnetic head according to the first embodiment only in the following aspects described below.

Figure 18:
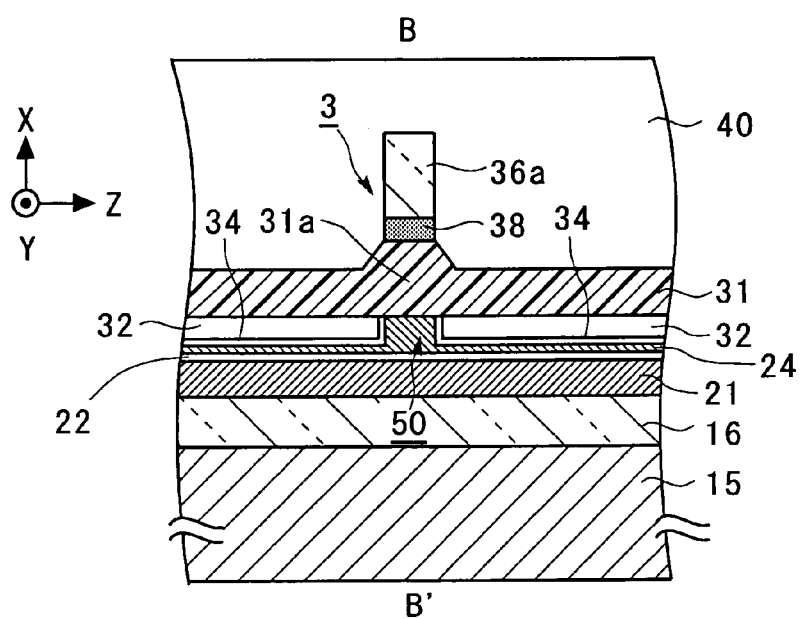
FIG. 18 is a general sectional view taken along a line A-A' indicated by arrows in FIG. 17.
Figure 19:
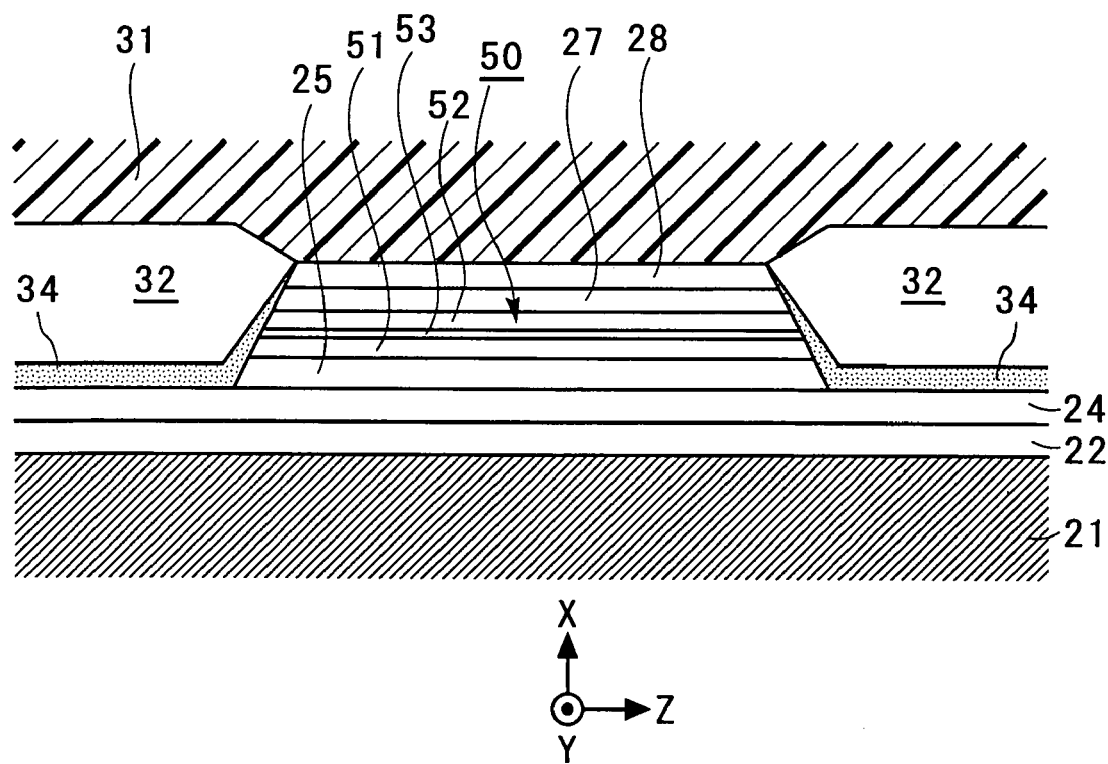
FIG. 19 is a further enlarged view around the GMR device in FIG. 18.

In the eighth embodiment, a GMR device 50 is formed instead of the TMR device 2, as illustrated in FIGS. 17 to 19. The GMR device 50 differs from the TMR device 2 in that non-magnetic metal layers 51, 52 are formed instead of the tunnel barrier layer 26, and that the current path control layer 53 is formed between the non-magnetic metal layer 51 and non-magnetic metal layer 52. A pinning layer 24, a pinned layer 25, the non-magnetic metal layer 51, the current path control layer 53, the non-magnetic metal layer 52, and a free layer 27, which are laminated in this order from the lower side, constitute a magneto-resistive layer (a so-called spin valve film in the eighth embodiment). The non-magnetic metal layers 51, 52 are made, for example, of such a material as Cu, Au, or Ag.

In the eight embodiment, the pinned layer 25, non-magnetic metal layers 51, 52, current path control layer 53, free layer 27, and cap layer 28 substantially exactly overlap one another, and a region in which they overlap one another functions as an effective region effectively involved in detection of magnetism in the magneto-resistive layer (in the eighth embodiment, a region in which a current flows in a direction substantially perpendicular to the film plane in the magneto-resistive layer). The eighth embodiment differs from the first embodiment in that the pinning layer 24 extends widely beyond the region overlapping with the effective region, as illustrated in FIGS. 17 to 19. The lower surface of the pinning layer 24 is entirely in electric contact with the upper surface of an electrode 21 through lower metal layers 22, 23. The width of the pinning layer 24 may be the same as the width of the free layer 27.

In the eighth embodiment, the current path control layer 53, which is an oxide layer, partially has a metal region within an insulating region made of an oxide of Ta, Al, Co, Fe, Ni, or the like, by way of example. The thickness of the current path control layer 53 can be, for example, 2 nm or less. Since the current path control layer 53 has the metal region partially formed within the insulating region, the current path control layer 53 effectively reduces the area of a path for a sense current which flows between the upper metal layer 27 and the free layer 26, and can provide similar effects to those which are provided when the area of the effective region is narrowed down, without actually narrowing down the area of the effective region. For example, the current path control layer 53 may be formed in locations one or more locations between the layers 24 and 25, between the layers 25 and 51, between the layers 52 and 27, and between the layers 27 and 28. Also, when any of the layers 24, 25, 27 is, for example, a laminate of a plurality of laminated layers (a plurality of constituent layers), the current path control layer 53 may be formed between two layers of the plurality of constituent layers.

While the upper metal layer 29 is formed as an underlying layer of the upper electrode 31 in the first embodiment, the upper metal layer 29 is not formed in the eighth embodiment.

The magnetic head according to the eighth embodiment can be manufactured by a manufacturing method similar to the manufacturing method according to the second or third embodiment.

The eighth embodiment is similar to the first embodiment in that the variation reducing layer 4c made of an oxide of a metal or an oxide of a semiconductor is in contact with an end face of the current path control layer 53, which is an oxide layer, on the ABS side. Accordingly, in the eighth embodiment, even if the magnetic head is left in a high temperature environment, oxygen present in the current path control layer 53 is less prone to go out of the current path control layer 53, and remains within the current path control layer 53. Therefore, the resistance of the current path control layer 53 is not significantly reduced to cause less variations in the resistance of the GMR device 50, thus improving the stability of the characteristics against a high temperature environment.

In the present invention, a similar modification made to the magnetic head according to the first embodiment to provide the magnetic head according to the fourth embodiment may be applied to the magnetic head according to the eighth embodiment. This magnetic head can be manufactured by a manufacturing method similar to the fifth embodiment.

Next, a magnetic disk apparatus according to a ninth embodiment of the present invention will be described with reference to FIG. 20.

Figure 20:
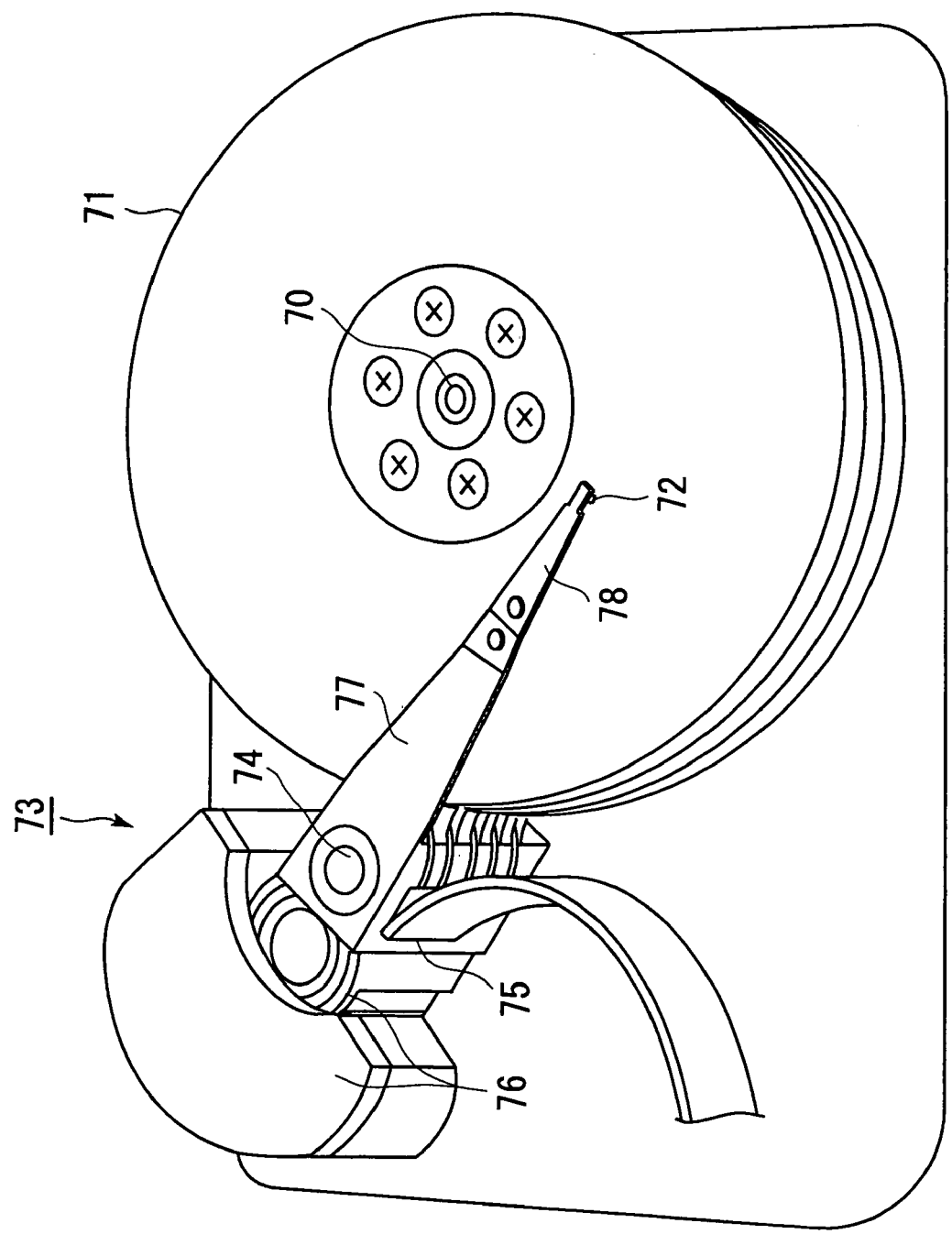
FIG. 20 is a perspective view generally illustrating the configuration of a main portion of a magnetic disk apparatus according to a ninth embodiment of the present invention.

FIG. 20 is a perspective view generally illustrating the configuration of a main portion of a magnetic disk apparatus according to a ninth embodiment of the present invention.

The magnetic disk apparatus according to the ninth embodiment comprises magnetic disks 71 rotatably mounted about a shaft 70; magnetic heads 72 each for recording and reproducing information to or from associated one of the magnetic disks 71; and an assembly carriage device 73 for positioning the magnetic head 72 on a track of the magnetic disk 71.

The assembly carriage device 73 mainly comprises a carriage 75 mounted for pivotal movements about a shaft 74; and an actuator 76 comprised, for example, of a voice coil motor (VCM) for rotating the carriage 75.

The carriage 75 is mounted with bases of a plurality of driving arms 77 which are stacked in the direction of the shaft 74. A head suspension assembly 78 is secured at the leading end of each driving arm 77. Each head suspension assembly 78 has the magnetic head 72 mounted on the leading end thereof. Each head suspension assembly 78 is attached to the leading end of the driving arm 77 such that the associated magnetic head 72 opposes the surface of the associated magnetic disk 71.

In the ninth embodiment, the magnetic disk apparatus comprises the magnetic heads according to any of the first, fourth and eighth embodiments described above, or the magnetic heads manufactured by the magnetic head manufacturing method according to the sixth or seventh embodiments. Therefore, according to the ninth embodiment, the stability of the characteristics against a high temperature environment is improved.

A magnetic head of Sample 14 was manufactured through the same steps as the manufacturing methods according to the second and third embodiments except that the variation reducing layer 4c was not formed. Sample 14 does not have the variation reducing layer 4c, and therefore corresponds to the magnetic head according to the comparative example illustrated in FIG. 7.

Magnetic heads of Samples 1-8 were manufactured through the same steps as the manufacturing method according to the second embodiment. Also, magnetic heads of Samples 9-12 were manufactured through the same steps as the manufacturing method according to the third embodiment. Further, a magnetic head of Sample 13 was manufactured through the same steps as the manufacturing method according to the fifth embodiment. The magnetic heads of Samples 1-12 correspond to the magnetic head according to the first embodiment, while the magnetic head of Sample 13 corresponds to the magnetic head according to the fourth embodiment.

When Sample 14 was manufactured, the variation reducing layer 4c was not formed. When Samples 1-8 were manufactured, metal or semiconductor layers were deposited with their materials and thickness changed as shown in Table 2, and were naturally oxidized to form the variation reducing layers 4c. When Samples 9-12 were manufactured, ion beam deposition was performed with materials as shown in Table 2 used as targets without using oxygen for a process gas to form the variation reducing layers 4c having the materials and thicknesses as shown in Table 2. When Sample 13 was manufactured, the surface of the bar 102 shown in Table 2 (therefore, the end portions of the respective layers formed to make up the TMR device 2 on the ABS side) was naturally oxidized to form the variation reducing layer 4c. Other conditions were the same for any of Samples 1-14. The compositions of main layers in Samples 1-14 are shown in Table 1.

TABLE 1

| Name of Layer and Reference Numeral in Drawings | Composition and Thickness of Layer (When composed of two layers or more, a layer more to the left is positioned lower (near the substrate)) |
|---|---|
| Protection Film 4a | DLC(2 nm) |
| Underlying Layer 4b | Si(2 nm) |
| Variation Reducing Layer 4c | As shown in Table 2 |
| Upper Electrode 31 (serving also as Upper Magnetic Shield) | NiFe(2 μm) |
| Upper Metal Layer 29 | Ta(5 nm) |
| Insulating Layer 30 | Al$_2$O$_3$(60 nm) |
| Vertical Biasing Layer 32 | CrTi(5 nm)/CoCrPt(25 nm)/Ta(5 nm) |
| Insulating Layer 34 | Al$_2$O$_3$(10 nm) |
| Cap Layer 28 | Ta(18 nm) |
| Free Layer 27 | CoFe(1 nm)/NiFe(3 nm) |
| Tunnel Barrier Layer 26 | Al$_2$O$_3$(0.6 nm) |
| Pinned Layer 25 | CoFe(2 nm)/Ru(0.8 nm)/CoFe(3 nm) |
| Pining layer 24 | PtMn(15 nm) |
| Lower Metal Layer 22 | Ta(5 nm)/NiFe(2 nm) |
| Lower Electrode 21 (serving also as Lower Magnetic Shield) | NiFe(2 μm) |

TABLE 2

| | Variation Reducing Layer 4c | Resistance Changing Ratio before and after High Temperature Test (%) |
|---|---|---|
| Sample 1 | Ta(0.5 nm) + Natural Oxidization | +0.9 |
| Sample 2 | Ta(1 nm) + Natural Oxidization | +0.4 |
| Sample 3 | Al(0.5 nm) + Natural Oxidization | +1.1 |
| Sample 4 | Al(1 nm) + Natural Oxidization | +0.5 |
| Sample 5 | Si(0.5 nm) + Natural Oxidization | −1.5 |
| Sample 6 | Si(1 nm) + Natural Oxidization | −0.6 |
| Sample 7 | Ti(0.5 nm) + Natural Oxidization | +1.1 |
| Sample 8 | Ti(1 nm) + Natural Oxidization | +0.3 |
| Sample 9 | Al$_2$O$_3$ (Deposited without Oxygen) (1 nm) | +1.3 |
| Sample 10 | Al$_2$O$_3$ (Deposited without Oxygen) (2 nm) | +1.4 |
| Sample 11 | SiO$_2$ (Deposited without Oxygen) (1 nm) | −0.6 |
| Sample 12 | SiO$_2$ (Deposited without Oxygen) (2 nm) | −0.8 |
| Sample 13 | Formed by naturally oxidized end portions of constituent layers of TMR device 2 on ABS side | −0.3 |
| Sample 14 | Not Formed | −3.8 |

When Samples 1-8 were manufactured, the natural oxidization in forming the variation reducing layer 4c was performed by leaving the bar 102 in the atmosphere for 30 minutes.

When Samples 9-12 were manufactured, the variation reducing layer 4c was deposited by ion beam deposition under the following conditions. The chamber was evacuated to a residual gas pressure of $1 \times 10^{-5}$ Pa using an ion beam deposition apparatus. An Ar gas was introduced from a gas introduction pipe to a target irradiating ion gun at a rate of 8 sccm. No oxygen was introduced into the chamber as a process gas. The target irradiating ion gun was driven with an accelerating voltage equal to 1,500 volts, an accelerating current equal to 400 mA, and a current to a neutralizer equal to 600 mA.

Further, when Sample 13 was manufactured, the natural oxidization of the respective layers formed to make up the TMR device for forming the variation reducing layer 4c was performed by leaving the bar 102 in the atmosphere for 30 minutes.

Then, each of Samples 1-14 underwent a high temperature test in which each sample was left in an environment at 125° C. for 240 hours, and the resistance of the TMR device 2 was measured before and after the high temperature test. Table 2 shows a resistance changing ratio calculated from the measured resistances before and after the high temperature test for Samples 1-14. The resistance changing ratio was calculated in accordance with the following equation:

Resistance Changing Ratio={(Resistance after High Temperature Test−Resistance before High Temperature Test)/Resistance before High Temperature Test}×100 [%]

As can be seen from Table 2, the sample 14 representative of the comparative example has the resistance changing ratio of −3.8%, indicating that the resistance of the TMR device 2 was relatively largely reduced after the high temperature test. In contrast, Samples 1-12 representative of the first embodiment and Sample 13 representative of the fourth embodiment have the resistance changing ratios of 1.1% or less in absolute value, showing that the variations in the resistance of the TMR device 2 was limited before and after the high temperature test.

It should be noted that the variation reducing layers 4c of Samples 1-13 had insulating properties to such an extent that they would never affect the operation of the TMR device 2.

It should be understood that the thicknesses of the variation reducing layers 4c are not limited to the examples shown in Table 2.

As described above, although the explanation has been made as to the respective embodiments and examples according to the present invention, the present invention is not limited thereto.

As described above, the present invention can provide a magnetic head which comprises a magneto-resistive device having a magneto-resistive layer including an oxide layer but has less variations in the resistance of the magneto-resistive device before and after the magnetic head is left in a high temperature environment to have higher stability of the characteristics of the magnetic head against a high temperature environment, a method of manufacturing such a magnetic head, and a head suspension assembly and a magnetic disk apparatus which employ the magnetic head.

What is claimed is:

1. A method of manufacturing a magnetic head comprising:
   a base;
   a magneto-resistive device having a magneto-resistive layer including an oxide layer, said magneto-resistive layer being formed on one surface side of said base; and
   a protection film and an underlying layer therefor which are formed on at least a part of a surface of said base on a side facing to a magnetic recording medium and on an end face of said magneto-resistive device on a side facing to the magnetic recording medium, wherein:
   an end face of said oxide layer on a side facing to the magnetic recording medium forms a part of said end face of said magneto-resistive device on the side facing to the magnetic recording medium,
   one or more layers are interposed between said underlying layer and said end face of said magneto-resistive device to cover at least said end face of said oxide layer;
   said underlying layer is made of a non-oxide material; and
   the layer of said one or more layers closest to said end face of said magneto-resistive device is made of an oxide of a metal or an oxide of a semiconductor, the method comprising the step of:
   forming said layer of said one or more layers closest to said end face of said magneto-resistive device in a region including said end face of said magneto-resistive device on the side facing to the magnetic recording medium before forming said protection film,
   wherein said step includes a first step of depositing a metal or a semiconductor, and a second step of oxidizing said metal or semiconductor deposited in said first step.

2. A method of manufacturing a magnetic head according to claim 1, further comprising the step of:
   thermally treating a member formed with said protection film after the formation of said protection film.

3. A method of manufacturing the magnetic head according to claim 1, comprising the step of:
   forming said layer of said one or more layers closest to said end face of said magneto-resistive device in a region including said end face of said magneto-resistive device on the side facing to the magnetic recording medium before forming said protection film,
   wherein said step includes the step of performing ion beam deposition or sputtering using an oxide of a metal or an oxide of a semiconductor as a target without using oxygen for a process gas.

4. A method of manufacturing a magnetic head according to claim 3, further comprising the step of:
   thermally treating a member formed with said protection film after the formation of said protection film.

5. A method of manufacturing the magnetic head according to claim 1, wherein:
   said magneto-resistive layer includes a metal layer laminated adjacent to said oxide layer,
   an end face of said metal layer on a side facing to the magnetic recording medium forms a part of said end face of said magneto-resistive device on the side facing to the magnetic recording medium,
   said one or more layers are formed to cover said end face of said metal layer,
   said layer of said one or more layers closest to said end face of said magneto-resistive device includes:
   a portion which is made of the same elements as elements which participate in making said oxide layer, and covers said end face of said oxide layer; and
   a portion which is made of an oxide of the same metal as a metal which participates in making said metal layer, and covers said end face of said metal layer, the method further comprising the step of:
   forming said layer of said one or more layers closest to said end face of said magneto-resistive device in a region including said end face of said magneto-resistive device on the side facing to the magnetic recording medium before forming said protection film,
   wherein said step includes the step of oxidizing an end portion of a layer formed to make up said magneto-resistive device.

6. A method of manufacturing a magnetic head according to claim 5, further comprising the step of:
   thermally treating a member formed with said protection film after the formation of said protection film.

7. A method of manufacturing a magnetic head comprising: a base; a magneto-resistive device having a magneto-resistive layer including an oxide layer, said magneto-resistive layer being formed on one surface side of said base; and a protection film formed on at least a part of a surface of said base on a side facing to a magnetic recording medium and on an end face of said magneto-resistive device on a side facing to the magnetic recording medium; wherein an end face of said oxide layer on a side facing to the magnetic recording medium forms a part of said end face of said magneto-resistive device on the side facing to the magnetic recording medium, one or more layers are interposed between said protection film and said end face of said magneto-resistive device to cover at least said end face of said oxide layer, and the layer of said one or more layers closest to said end face of said magneto-resistive device is made of an oxide of a metal or an oxide of a semiconductor, said method comprising the step of:
   forming said layer of said one or more layers closest to said end face of said magneto-resistive device in a region including said end face of said magneto-resistive device on the side facing to the magnetic recording medium before forming said protection film,
   wherein said step includes a first step of depositing a metal or a semiconductor, and a second step of oxidizing said metal or semiconductor deposited in said first step.

8. A method of manufacturing a magnetic head comprising: a base; a magneto-resistive device having a magneto-resistive layer including an oxide layer, said magneto-resistive layer being formed on one surface side of said base; and a protection film formed on at least part of a surface of said base on a side facing to a magnetic recording medium and on an end face of said magneto-resistive device on a side facing to the magnetic recording medium; wherein an end face of said oxide layer on a side facing to the magnetic recording medium forms a part of said end face of said magneto-resistive device on the side facing to the magnetic recording medium, one or more layers are interposed between said protection film and said end face of said magneto-resistive device to cover at least said end face of said oxide layer, and the layer of said one or more layers closest to said end face of said magneto-resistive device is made of an oxide of a metal or an oxide of a semiconductor, said method comprising the step of:

forming said layer of said one or more layers closest to said end face of said magneto-resistive device in a region including said end face of said magneto-resistive device on the side facing to the magnetic recording medium before forming said protection film, wherein said step includes the step of performing ion beam deposition or sputtering using an oxide of a metal or an oxide of a semiconductor as a target without using oxygen for a process gas.

9. A method of manufacturing a magnetic head comprising: a base; a magneto-resistive device having a magneto-resistive layer including an oxide layer and a metal layer, said magneto-resistive layer being formed on one side of said base, said oxide layer and said metal layer being laminated adjacent to each other; and a protection film formed on at least a part of a surface of said base on a side facing to a magnetic recording medium and on an end face of said magneto-resistive device on a side facing to the magnetic recording medium; wherein end faces of said oxide layer and said metal layer on a side facing to the magnetic recording medium forms parts of said end face of said magneto-resistive device on the side facing to the magnetic recording medium, one or more layers are interposed between said protection film and said end face of said magneto-resistive device to cover at least said end faces of said oxide layer and said metal layer, and the layer of said one or more layers closest to said end face of said magneto-resistive device is made of an oxide of a metal or an oxide of a semiconductor, said layer of said one or more layers closest to said end face of said magneto-resistive device includes a portion which is made of the same elements as elements which participate in making said oxide layer and covers said end face of said oxide layer and a portion which is made of an oxide of the same metal as a metal which participates in making said metal layer and covers said end face of said metal layer, said method comprising the step of:

forming said layer of said one or more layers closest to said end face of said magneto-resistive device in a region including said end face of said magneto-resistive device on the side facing to the magnetic recording medium before forming said protection film, wherein said step includes the step of oxidizing an end portion of a layer formed to make up said magneto-resistive device.

* * * * *